United States Patent [19]

Billi et al.

[11] Patent Number: 4,558,187
[45] Date of Patent: Dec. 10, 1985

[54] DIGITAL ECHO-CANCELLATION METHOD AND CIRCUIT ARRANGEMENT

[75] Inventors: Roberto Billi, Leghorn; Maurizio Copperi, Turin, both of Italy

[73] Assignee: CSELT - Centro Studi e Laboratori Telecomunicazioni S.p.A., Turin, Italy

[21] Appl. No.: 319,086

[22] Filed: Nov. 6, 1981

Related U.S. Application Data

[63] Continuation-in-part of Ser. No. 70,032, Aug. 27, 1979, abandoned.

[30] Foreign Application Priority Data

Aug. 29, 1978 [IT] Italy ................................ 68993 A/78

[51] Int. Cl.$^4$ ............................................... H04B 3/24
[52] U.S. Cl. ............................... 179/170.2; 179/170.4
[58] Field of Search ............... 179/170.2, 170.6, 170.8, 179/170.4

[56] References Cited

U.S. PATENT DOCUMENTS

| | | | |
|---|---|---|---|
| 3,810,182 | 5/1974 | White et al. | 343/180 |
| 4,072,830 | 2/1978 | Gitlinet et al. | 179/170.2 |
| 4,162,378 | 7/1979 | Baudoux et al. | 179/170.2 |

FOREIGN PATENT DOCUMENTS 2029175  3/1980  United Kingdom .

OTHER PUBLICATIONS

N. Demytko & L. K. Mackechnie; "A High Speed Digital Adaptive Echo Canceller"; Australian Telecommunications Research; vol. 7; No. 1; 1973; pp. 20–28.
J. A. Webb & M. W. Kelly; "Telephone Echo Cancellation for Satellite Terminals"; ICC 1978; IEEE Paper No. 10.5.1.
H. Brueggeman, G. Kidd, L. K. Mackechnie, A. Seyler; "An Experimental Adaptive Echo Canceller for Long Distance Telephone Circuits"; Radio & Electronic Engineer; vol. 43; No. 4; Apr. 1973.
S. Campanella, H. Suyderhoud, M. Onufry; "Analysis of an Adaptive Impulse Response Echo Canceller"; Comstat Technical Review; vol. 2; No. 1; Spring 1972; pp. 20–36.

Primary Examiner—Thomas W. Brown
Assistant Examiner—Randall P. Myers
Attorney, Agent, or Firm—Karl F. Ross; Herbert Dubno

[57] ABSTRACT

A four-wire trunk line of a telephone network, operating with frequency-division multiplexing, is coupled by a hybrid coil to a local two-wire line and is provided, at a location separated from that hybrid coil by frequency modulators and demodulators, with an echo canceler connected across its receiving and transmitting branches. In order to eliminate frequency offset resulting from the incoherent modulation and demodulation, the echo canceler coacts with the phase-roll compensator comprising a phase-locking loop driven, during an acquisition phase, from a digital pilot-tone generator temporarily connected via a digital/analog converter to the receiving branch. The loop includes an analog/digital converter in the transmitting branch receiving the echo of the pilot tone due to hybrid-coil unbalance, a 90° phase shifter and a delay line which are connected in parallel to the output of that converter and work into respective multipliers whose output signals are summed in a digital adder, another multiplier heterodyning the adder output with the pilot tone to produce a digital beat frequency, and a function generator feeding sine and cosine functions of that beat frequency to the multipliers that are respectively coupled to the phase shifter and to the delay line. The output signals from the loop adder pass through the echo canceler, which operates on them in a working phase, to another digital/analog converter inserted in the transmitting branch. In another embodiment the tasks of the phase-roll compensator are performed by a microprogrammed processor.

6 Claims, 13 Drawing Figures

DIGITAL ECHO-CANCELLATION METHOD AND CIRCUIT ARRANGEMENT

CROSS-REFERENCE TO RELATED APPLICATION

The present application is a continuation-in-part of our copending application Ser. No. 070,032 filed Aug. 27, 1979 and now abandoned.

FIELD OF THE INVENTION

Our present invention relates to a method of and a circuit arrangement for eliminating outgoing echoes appearing on a transmitting branch of a telephone trunk line, which forms part of a carrier system and is coupled by means of a hybrid coil to a two-wire local line, in response to incoming speech signals arriving at that local line via a receiving branch of the trunk line.

BACKGROUND OF THE INVENTION

Theoretically, the use of a hybrid coil matching such a carrier system to a bidirectional two-wire local line should completely isolate the two trunk branches from each other as far as voice signals are concerned. In practice, however, the hybrid coil is subjected to a minor unbalance or mismatch giving rise to echoes that return to the remote caller with a certain time lag dependent on the physical length of the trunk (which could, in part, be constituted by radio links).

Such echoes become particularly annoying when the time lag exceeds 50 ms. Various means have therefore already been proposed for dealing with the problem. One known solution utilizes an echo suppressor which, upon detecting an incoming voice signal, inserts a high attenuation in the echo path. That attenuation, of course, must be removed as soon as the other subscriber begins to talk; the unavoidable delay in such removal results in chopped or mutilated words. In the case of "double speech", i.e. with both subscribers talking simultaneously (as is especially frequent with long-range communication via satellite), the echo suppressor is entirely ineffectual.

An alternative solution resides in the use of a so-called echo canceler, e.g. as described in an article by J. A. Webb and M. W. Kelly, entitled "Telephone Echo Cancellation For Satellite Terminals", ICC 78, Paper No. 10.5.1. See also an article entitled "Analysis of an Adaptive Impulse Response Echo Canceller" by S. J. Campanella, H. G. Suyderhoud and M. Onufry, published in COMSAT Technical Review, Vol. 2, No. 1 Spring 1972, and another article entitled "An Experimental Adaptive Echo Canceller For Long Distance Telephone Circuits" by H. Brueggemann, G. Kidd, L. K. MacKechnie and A. J. Seyler, published in The Radio And Electronic Engineer, Vol. 43, No. 4, April 1973. Such an echo canceler detects voice signals on the receiving branch of the trunk line and calculates, on the basis of circuit parameters such as the pulse response of the hybrid coil, the resulting echoes expected to appear on the transmitting branch. This echo replica is subtracted from the effective echo signals, thus reducing subscribers' annoyance. The known echo cancelers operate digitally and in some instances use recursive transversal filtering for progressive reduction of the estimate error. The estimate may also be obtained, according to the above-identified article by J. A. Webb and M. W. Kelly, by constructing an artificial model of the echo channel through test signals which may consist of a pseudorandom signal sequence.

Adaptive echo cancelers, continuously adjusting themselves to changes in the response characteristics of the echo channel, require complex circuitry operating with high-speed algorithms. Even so, the adapting mechanism must be deactivated during double speech.

One of the factors affecting the echoes, especially in a system utilizing frequency-division multiplexing, is the phenomenon known as "phase roll", i.e. the phase shift occurring in the echo channel. This phase roll, resulting from noncoherent demodulation of the FDM carriers at points of the unidirectional line branches remote from the points of modulation, causes an offset of all voice-frequency components between the transmitted speech signals and their returning echoes. Such a frequency offset, though limited to not more than 3 Hz by CCITT recommendations, exerts a significant influence upon the estimate elaborated by the echo canceler.

OBJECTS OF THE INVENTION

An important object of our present invention, therefore, is to provide a method of compensating for the effect of phase roll upon echo cancellation in a trunk line of the type described above.

A related object is to provide relatively simple circuitry for carrying out this method.

SUMMARY OF THE INVENTION

We have found, in accordance with our present invention, that the frequency offset due to phase roll is substantially constant and identical for all incoming speech-signal components, enabling its compensation by a simple algorithm once the magnitude of that frequency offset has been determined. This algorithm involves the steps of generating sine and cosine functions of that frequency offset, phase-shifting outgoing echo and near-talker voice signals by 90° which are being sent to a remote trunk terminal, multiplying these phase-shifted signals by the aforementioned sine functions, delaying unshifted outgoing signals by a time compensating for delays encountered by the phase-shifted signals, multiplying the delayed unshifted signals by the aforementioned cosine functions, adding the two multiplication products to produce outgoing signals purged of phase roll, storing correlation signals derived from received signals and from purged transmitted echoes thereof, and subjecting the purged signals to an echo-cancellation treatment based upon the correlation signals so stored. Advantageously, all these steps are performed digitally as particularly described hereinafter.

For an initial determination of the frequency offset, our invention calls for feeding a pilot tone to the receiving branch of the trunk line, treating the resulting pilot-tone echoes in the above-described manner while deriving the sine and cosine functions at first from the pilot-tone frequency and subsequently from a beat frequency with the sum of the aforementioned multiplication products, and terminating the feeding of the pilot tone to the receiving branch of the trunk line after a time interval sufficient for the measurement.

A circuit arrangement embodying our invention, designed to carry out this new method, comprises a signal processor including a trigonometric generator of sine and cosine functions of values stored in an associated register which are representative of a frequency offset due to the phase roll existing between a received signal and a resulting echo, a signal processor in series with the transmitting branch including a 90° phase shifter in parallel with a delay line, the phase shifter and the delay line feeding respective multipliers also having input connections to the trigonometric-function generator, and an adder connected to the two multipliers for producing the sum of their products. A conventional echo calculator, e.g. as known from the above-identified prior publications, supplies a subtractor in the transmitting branch with suitably weighted cancellation signals for differentially combining same with the purged echo signals.

Pursuant to a more particular feature of our invention, the trigonometric-function generator is connected in a phase-locking loop forming part of a calibration circuit which includes heterodyning means (such as a digital multiplier followed by a low-pass filter) receiving the purged echo signals from the adder of the processor and further receiving the output of a pilot-tone generator for producing the above-mentioned beat frequency to be fed to the function generator. The pilot-tone generator is temporarily connected, via electronic switch means, to the receiving branch to let the phase-locking loop reach a steady-state condition in which the generated sine and cosine functions conform to a pulsatance corresponding to the frequency offset of the echo channel.

The calibration circuit, determining the frequency offset due to phase roll, may be connected to a read-only memory storing digital samples of sine and cosine functions of the frequency offset. We further prefer to provide an analog/digital converter linked to the branches for producing digital samples of voice-frequency signals carried by the branches, and a pseudo-random-sequence emitter tied at an output to the receiving branch of the trunk line. The stored digital samples serve to compensate the phase roll of signals arriving over the transmitting branch, for computing convolution coefficients from test signals generated by the sequence emitter and from the echoes of the test signals, for calculating in accordance with the computed convolution coefficients estimated echoes of voice-frequency signals carried by the receiving branch and for differentially combining echo estimates with corresponding phase-roll-compensated signals to produce digital samples of voice-frequency signals purged of echo effects. A digital/analog converter is connected in that case to an output of the signal processor for transforming echo-purged signal samples from digital form to analog form.

According to another feature of our present invention, the calibration circuit includes a source of a high-frequency binary reference signal and a frequency stabilizer connected to the transmitting branch for converting pilot-tone echoes into a binary pulse train. A comparison circuit produces a measure of the frequency offset in response to the frequencies of the pulse train and the reference signal, the comparison circuit being connected to the read-only memory for addressing the contents thereof by means of that measure.

The comparison circuit advantageously includes a first and a second counter which are stepped by the pulse train and the reference signal, respectively, and whose counting operations are initiated by a signal from the signal processor. The first counter has an output tied to a count-stop input of the second counter whereby the same counts a number of cycles of the reference signal in an interval defined by the occurrence of a predetermined number of cycles of the pulse train. An indexing circuit or decoder is inserted between the second counter and a third counter for converting into a modulus therefor a time measurement represented by the contents of the second counter. A fourth counter stepped by an output signal of the third counter feeds an address input of the read-only memory.

According to another advantageous feature of our present invention, the signal processor includes a multiplier/accumulator having a first input register and a second input register, a read/write memory being connected via a first data bus to the first input register and via a second data bus and a buffer register to the analog/digital converter for receiving therefrom and temporarily storing digital samples of voice-frequency signals carried by the branches. An additional read-only memory is tied via a third data bus to the second input register of the multiplier/accumulator and stores samples of test signals generated by the sequence emitter and coefficients for calculating a Hilbert transform utilized in compensating phase roll of signals arriving over the transmitting branch.

BRIEF DESCRIPTION OF THE DRAWING

These and other features of our present invention will now be described in detail with reference to the accompanying drawing in which.

SPECIFIC DESCRIPTION

Figure 1:
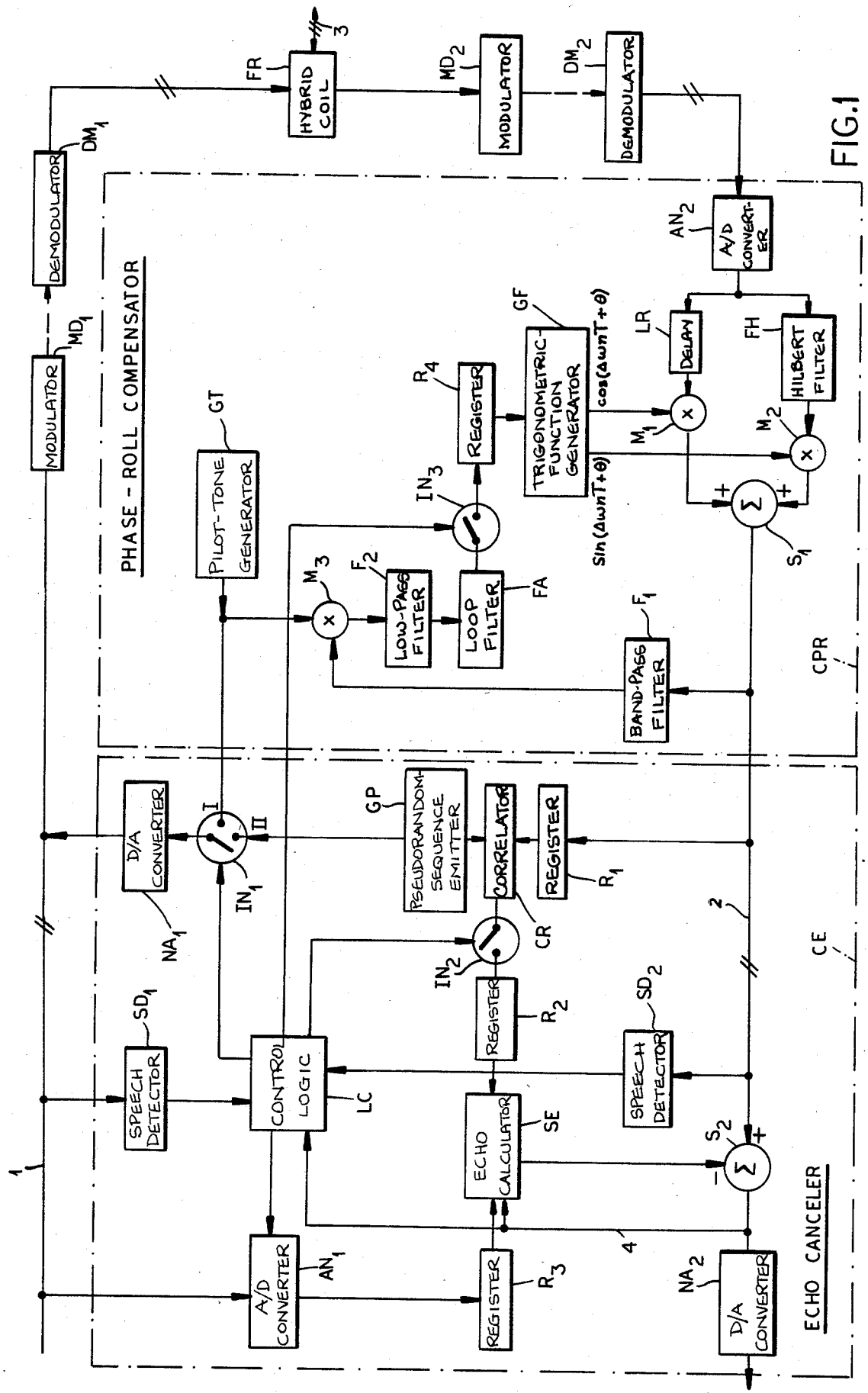
FIG. 1 is a block diagram of an improved echo-elimination device according to our present invention.

In FIG. 1 we have shown part of a four-wire trunk line, with a first or receiving two-wire branch 1 and a second or transmitting two-wire branch 2, coupled via a hybrid coil FR to a two-wire local line 3; its opposite (left-hand) end is connected to a nonillustrated remote trunk terminal. The two wires of connections 1, 2 and 3 have been conventionally indicated by pairs of short slanting strokes. This trunk line, carrying several voice channels modulated upon respective carriers of different frequencies, includes a modulator $MD_1$ and a demodulator $DM_1$ in its receiving branch 1 as well as a modulator $MD_2$ and a demodulator $DM_2$ in its transmitting branch 2. Components $DM_1$ and $MD_2$ are part of a near FDM terminal which, like the aforementioned remote terminal, also includes additional modulators and demodulators for other channels not shown.

Let us assume that an oscillation s(t) passing from modulator $MD_1$ to demodulator $DM_1$ on the receiving branch 1 is a carrier of frequency $f_0$ modulated with a single sideband by a voice signal x(t), according to the formula $$s(t) = \tfrac{1}{2} x(t) \cos \omega_0 t \pm \tfrac{1}{2} \hat{x}(t) \sin \omega_0 t \qquad (1)$$

where $\omega_0 = 2\pi f_0$; the symbol $\hat{x}(t)$ represents the Hilbert transform of signal x(t) and the sign ± is either positive or negative according to the sideband used.

Because of the frequency offset Δf existing between the oscillators of modulator $MD_1$ and demodulator $DM_1$, the baseband signal y(t) issuing from the demodulator will be of the form $$y(t) = \tfrac{1}{2} x(t) \cos (\Delta\omega t + \theta) \pm \tfrac{1}{2} \hat{x}(t) \sin (\Delta\omega t + \theta) \qquad (2)$$

This demodulated speech signal gives rise to an echo e(t) expressed, as is well known, by the convolution of signal y(t) with the pulse response h(t) of the hybrid coil FR, i.e.

$$\begin{aligned} e(t) = h(t) * y(t) &= \int_{-\infty}^{+\infty} h(\tau) y(t - \tau) d\tau \\ &= \tfrac{1}{2} \int_{-\infty}^{+\infty} h(\tau) x(t - \tau) \cos[\Delta\omega(t - \tau) + \theta] d\tau \\ &\pm \tfrac{1}{2} \int_{-\infty}^{+\infty} h(\tau) \hat{x}(t - \tau) \sin[\Delta\omega(t - \tau) + \theta] d\tau \end{aligned} \qquad (3)$$

The integral of equation (3) need only be taken over an interval between $\tau=0$ and $\tau=t_1$ so chosen that $\Delta\omega(t-t_1) \approx \Delta\omega t$. This makes the sine and cosine functions independent of $\tau$ and allows them to be placed outside the integral.

Let $$z(t) = \tfrac{1}{2} \int_0^{t_1} h(\tau) x(t - \tau) d\tau$$

and $$\hat{z}(t) = \tfrac{1}{2} \int_0^{t_1} h(\tau) \hat{x}(t - \tau) d\tau.$$

We can then rewrite equation (3) as follows:

$$e(t) = z(t) \cos (\Delta\omega t + \theta) \pm \hat{z}(t) \sin (\Delta\omega t + \theta) \qquad (4)$$

The Hilbert transform of echo e(t), representing a 90° phase shift, is given by $$\hat{e}(t) = z(t) \sin (\Delta\omega t + \theta) \mp \hat{z}(t) \cos (\Delta\omega t + \theta) \qquad (5)$$

Multiplying e(t) by cos $(\Delta\omega t+\theta)$ and ê(t) by sin $(\Delta\omega t+\theta)$ and adding the two products yields $$z(t) = \tfrac{1}{2} \int_0^{t_1} h(\tau) x(t - \tau) d\tau.$$

Thus, the signal so obtained is independent of frequency offset Δf.

Since the system shown in FIG. 1 operates digitally, as will presently become apparent, the time t is to be replaced in the foregoing equations by nT where T is a sampling period established by a nonillustrated time base and n is a progressively changing integer.

The echo-eliminating system according to our invention comprises, as its basic components, an essentially conventional echo canceler CE and a phase-roll compensator CPR both inserted between the left-hand sections of branches 1 and 2, conventionally referred to as "receive in" and "transmit out" sections, and their right-hand sections (including components $MD_1$, $DM_1$, $MD_2$ and $DM_2$) conventionally referred to as "receive out" and "transmit in" sections, respectively.

Echo canceler CE comprises an analog/digital converter $AN_1$ and a complementary digital/analog converter $NA_1$, both connected to branch 1. A control logic LC in component CE, stepped by an internal clock TB (see FIG. 2), sends operating instructions to all the elements of the echo canceler although only some of its output connections have been illustrated. One such output connection extends to an electronic switch $IN_1$ adapted to connect the input of converter $NA_1$ either to a pilot-tone generator GT in phase-roll compensator CPR (position I) or to a pseudorandom-sequence emitter GP in echo canceler CE (position II); in its illustrated normal position, switch $IN_1$ disconnects the input of converter $NA_1$ from the remainder of the circuitry.

The sequential test-signal emitter GP works into a correlator CR also receiving samples of outgoing digital signals (i.e. echoes of the test signals), extracted from branch 2, via a register $R_1$. Another electronic switch $IN_2$, controlled by logic circuit LC, lies between correlator CR and a register $R_2$ feeding an echo calculator SE also obtaining digitized samples of received speech signals from branch 1 via converter $AN_1$ and a register $R_3$. Echo calculator SE operates in conformity with equation (3) and may have a structure as described in the article by H. Brueggemann et al identified above but modified for digital operation. Logic circuit LC further receives the outputs of two speech detectors $SD_1$ and $SD_2$, respectively connected to branches 1 and 2, for a purpose to be described.

Component CPR comprises a digital signal processor inserted in branch 2 downstream of another analog/digital converter $AN_2$, this processor comprising a Hilbert filter FH acting essentially as a 90° phase shifter, a delay line LR connected in parallel with filter FH to the output of converter $AN_2$, two digital multipliers $M_1$ and $M_2$ in the outputs of delay line LR and phase shifter FH, respectively, and an adder $S_1$ receiving the output signals of multipliers $M_1$ and $M_2$. A trigonometric-function generator GF delivers a signal representing the function cos $(\Delta\omega nT + \theta)$ to multiplier $M_1$ and a signal representing the function sin $(\Delta\omega nT + \theta)$ to multiplier $M_2$.

Function generator GF is connected to the output of adder $S_1$ by a phase-locking loop which includes a digital band-pass filter $F_1$ blocking extraneous frequencies, a digital multiplier $M_3$ receiving the output of filter $F_1$ as well as the pilot tone digitally produced by generator GT, a low-pass filter $F_2$ suppressing the sum of the input frequencies of multiplier $M_3$ while transmitting a beat frequency corresponding to their difference, a loop filter FA limiting the range of acceptable beat frequencies, and a register $R_4$ reached via a further electronic switch $IN_3$ controlled by logic circuit LC. Multiplier $M_3$ and filter $F_2$ thus act as heterodyning means.

The phase-locking loop could also be constructed partly in analog form, e.g. with digital storage of the output of a frequency discriminator included in filter FA and conversion thereof into a control voltage for an oscillator replacing the function generator GF and digitization of an in-phase output and a quadrature output of that oscillator supplying the sine and cosine functions.

Band-pass filter $F_1$, register $R_1$ and speech detector $SD_2$ are connected to branch 2 at points between adder $S_1$ and another algebraic adder $S_2$ which forms part of echo canceler CE and has a subtractive input receiving the computed cancellation signals from calculator SE, thus operating as a subtractor. A digital/analog converter $NA_2$ is inserted downstream of subtractor $S_2$. Ahead of this converter, a lead 4 extends from branch 2 to logic circuit LC.

Figure 2:
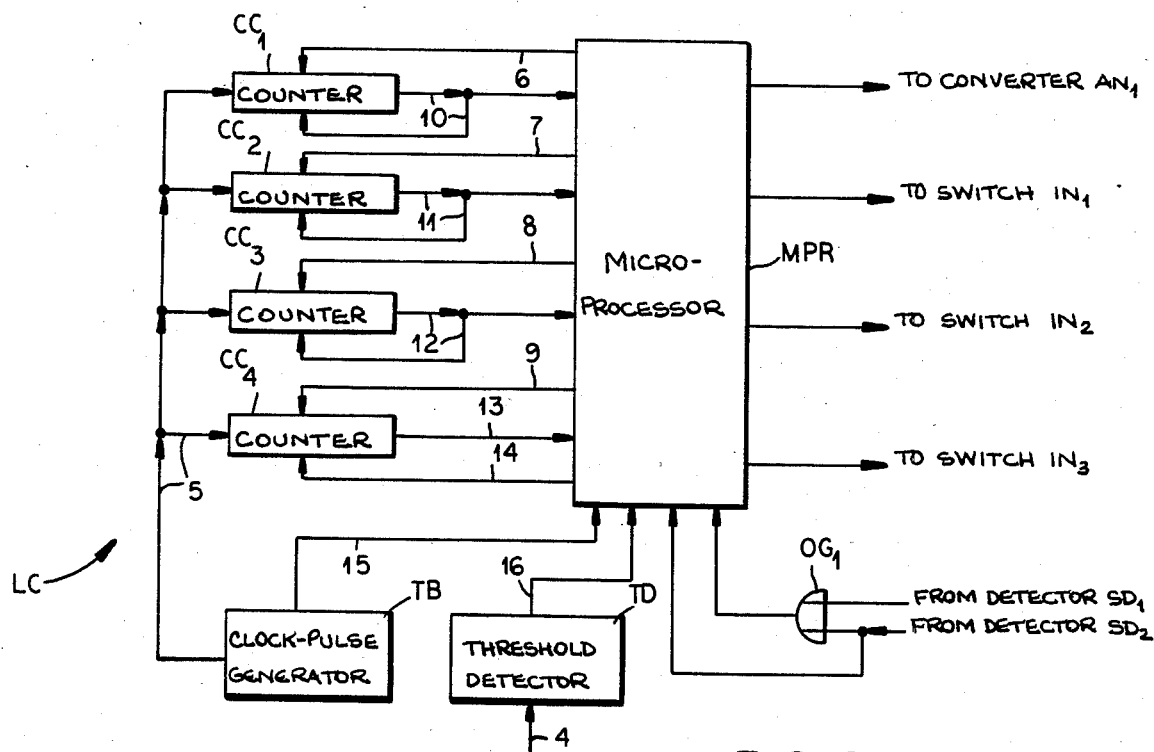
FIG. 2 is a diagram showing details of a control logic illustrated in block form in FIG. 1.

As illustrated in FIG. 2, logic LC may take the form of a microprocessor MPR with output leads extending to converter $AN_1$ and switches $IN_1$–$IN_3$ for controlling the operations thereof. Logic LC may also include four binary counters $CC_1$–$CC_4$ receiving stepping pulses from clock-pulse generator or time base TB via a lead 5. The incrementing of the counters commences upon the reception thereby of count-start signals from microprocessor MPR via respective leads 6, 7, 8 and 9. Upon attaining respective predetermined settings, counters $CC_1$–$CC_4$ energize respective output leads 10, 11, 12 and 13 which work into microprocessor MPR. Leads 10–12 extend back to resetting inputs of counters $CC_1$–$CC_3$, while counter $CC_4$ has a resetting input tied to an output lead 14 of the microprocessor.

Microprocessor MPR has inputs connected directly to speech detector $SD_2$ and indirectly to both speech detectors $SD_1$ and $SD_2$ via an OR gate $OG_1$. Further inputs of microprocessor MPR are tied to output leads 15 and 16 of clock-pulse generator TB and of a threshold detector TD which receives the output signals of subtractor $S_2$ (FIG. 1) via lead 4.

Figure 3:
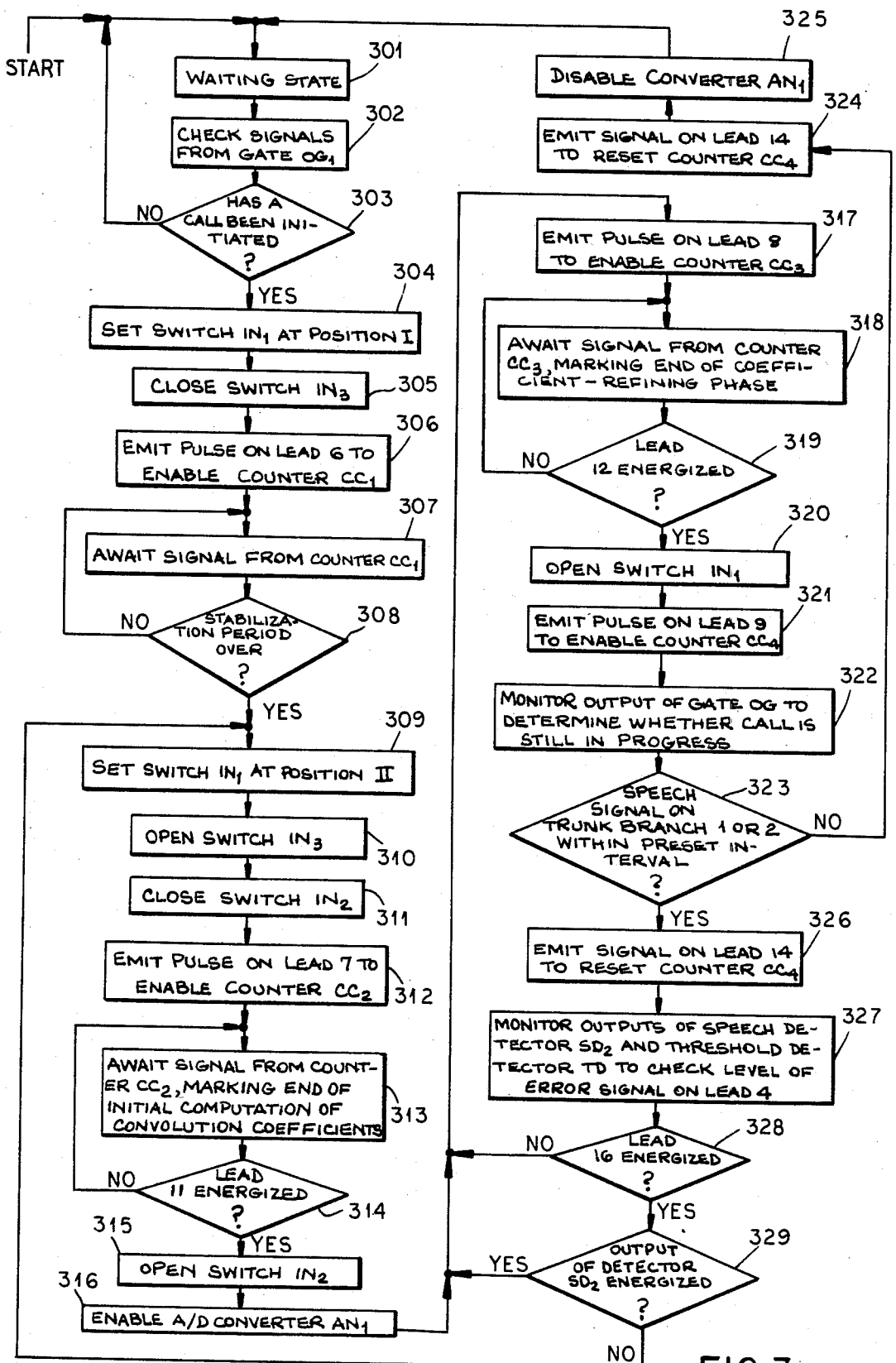
FIG. 3 is a flow chart indicating a sequence of functions performed by the logic circuit of FIGS. 1 and 2.

As indicated in the flow-chart diagram of FIG. 3, microprocessor MPR periodically leaves a waiting state 301 to execute a check 302 on the output voltage level of OR gate $OG_1$. If the microprocessor discovers in an inquiry 303 that the output of the OR gate is energized, thereby indicating the presence of voice signals on trunk branch 1 or 2, the microprocessor enters a sequence of steps 304–306 in which it sets switch $IN_1$ at position I, closes switch $IN_3$ and emits a pulse on lead 6 to enable the initiation of counting operations by counter $CC_1$ (FIG. 2). During a calibrating or acquisition period having a length determined by the modulus of counter $CC_1$ and the rate at which stepping pulses are emitted by generator TB over lead 5, register $R_4$ (FIG. 1) stores in its several stages a sufficient number of samples of a beat-frequency cycle which are sequentially read out, in the rhythm of a clock-pulse train of period T, to function generator GF. This generator preferably includes a read-only memory $PROM_1$ (see FIG. 5) addressed by the samples stored in register $R_4$.

Upon detecting in an inquiry 308 an energization of lead 10, marking the end of the calibrating or beat-frequency-stabilization period, microprocessor MPR leaves a waiting state 307 to execute a series of operations 309–311 on switches $IN_1$–$IN_3$: switch $IN_1$ is set at position II, switch $IN_3$ is opened and switch $IN_2$ is closed. In a step 312 the microprocessor then emits a pulse over lead 7 to enable the incrementing of counter $CC_2$ by the stepping pulses on lead 5. Counter $CC_2$ measures a predetermined interval sufficient for an initial or preliminary computation of convolution coefficients $h_i$ by correlator CR.

Upon displacement of switch $IN_1$ to its position II by logic circuit LC, sequential emitter GP sends out pseudorandom test signals to branch 1 whose echoes, purged of phase roll in processor FH, LR, $M_1$, $M_2$, $S_1$, reach correlator CR via register $R_1$ together with the output signals of device GP. With switch $IN_2$ closed and with converter $AN_1$ disabled by logic circuit LC at this time, convolution coefficients $h_i$ representative of the correlation between the test signals and their stored echoes are loaded into register $R_2$.

During the computation of the convolution coefficients by correlator CR, microprocessor MPR awaits at 313 a signal from counter $CC_2$ marking the end of the computation period. Upon detecting in an inquiry 314 the energization of lead 11 by counter $CC_2$, microprocessor MPR opens switch $IN_2$ (step 315) and enables converter $AN_1$ (step 316). In a conter-activation step 317 microprocessor MPR then generates a pulse on lead 8 to enable the stepping of counter $CC_3$ by pulses from time base TB.

Upon the computation of the coefficient estimates by correlator CR and the enabling of converter $AN_1$ by microprocessor MPR, register $R_3$ receives, over this converter, digitized samples of the sequences produced by emitter GP and issuing in analog form from converter $NA_1$ (see FIG. 1). Calculator SE responds to the digitized samples in register $R_3$ and the coefficient estimates in register $R_2$ by delivering suitably weighted cancellation signals to adder $S_2$ for subtraction from the echo pulses. Lead 4 feeds back the residual echoes from adder/subtractor $S_2$ to calculator SE which readjusts itself to improve the cancellation until the echo level is substantially zero. This refinement by calculator SE, on the basis of pseudorandom test signals stored in register $R_3$ and an error signal from adder $S_2$, of the convolution coefficients originally produced by correlator CR proceeds during an interval having a duration determined by the modulus of counter $CC_3$ and the rate of stepping by generator TB. Upon detecting at 319 the energization of lead 12, marking the end of a coefficient-refinement phase, microprocessor MPR leaves a waiting state 318. The coefficient refinement just described, involving program steps 317–319 and the use of counter $CC_3$, is of course feasible only if and when branch 1 allows for a reverse transmission of signals from converter $NA_1$ to converter $AN_1$. In any event, this procedure is not essential for the operation of echo canceler SE or of the overall system.

Microprocessor MPR next proceeds to open switch $IN_1$ (step 320) and to emit a pulse over lead 9 (step 321) for enabling the stepping of counter $CC_4$ by the pulse train on lead 5. The microprocessor then monitors at 322 the output-voltage level of OR gate $OG_1$ to determine whether the call is still in progress. If no signal appears at the output of the OR gate within a preset interval, as ascertained by microprocessor MPR at a decision junction 323, the microprocessor re-enters waiting state 301 upon resetting counter $CC_4$ in a step 324 and disabling converter $AN_1$ in a step 325. If on the contrary a speech signal appears on trunk branch 1 or 2 within the preset interval determined in part by the number of stages of counter $CC_4$, the microprocessor begins a scan 327 of the outputs of speech detector $SD_2$ and threshold detector TD upon emitting a signal at 326 for resetting counter $CC_4$. A signal of high logic level on lead 16 together with a signal of low logic level from speech detector $SD_2$, discovered in inquiries 328, 329 and indicating the presence of an error signal on lead 4 beyond the capacity of calculator SE to rectify, induces microprocessor MPR to re-execute steps 309–315, thereby loading register $R_2$ with convolution-coefficient estimates updated by correlator CR.

Since the pilot tone from generator GT and the test signals from sequential emitter GP lie within the voice-frequency band handled by hybrid coil FR, their amplitudes should be low so as not to annoy the subscribers. The above-described operations should nevertheless be carried out with the subscribers already connected since the echoes are also affected by the characteristics of the local line 3. Microprocessor MPR is advantageously programmed to set switch $IN_1$ at position I or II only if the output of OR gate $OG_1$ (FIG. 2) is de-energized; thus, pilot tones or sequential test signals will be emitted onto trunk branch 1 only in the absence of speech signals on branches 1 and 2.

It is to be noted that when the calibration phase has ended, switch $IN_1$ has moved into position II and switch $IN_3$ is reopened, function generator GF will be operating in a steady state; it continues to emit the functions $\cos(\Delta\omega nT+\theta)$ and $\sin(\Delta\omega nT+\theta)$ on the basis of samples stored in register $R_4$.

Figure 4:
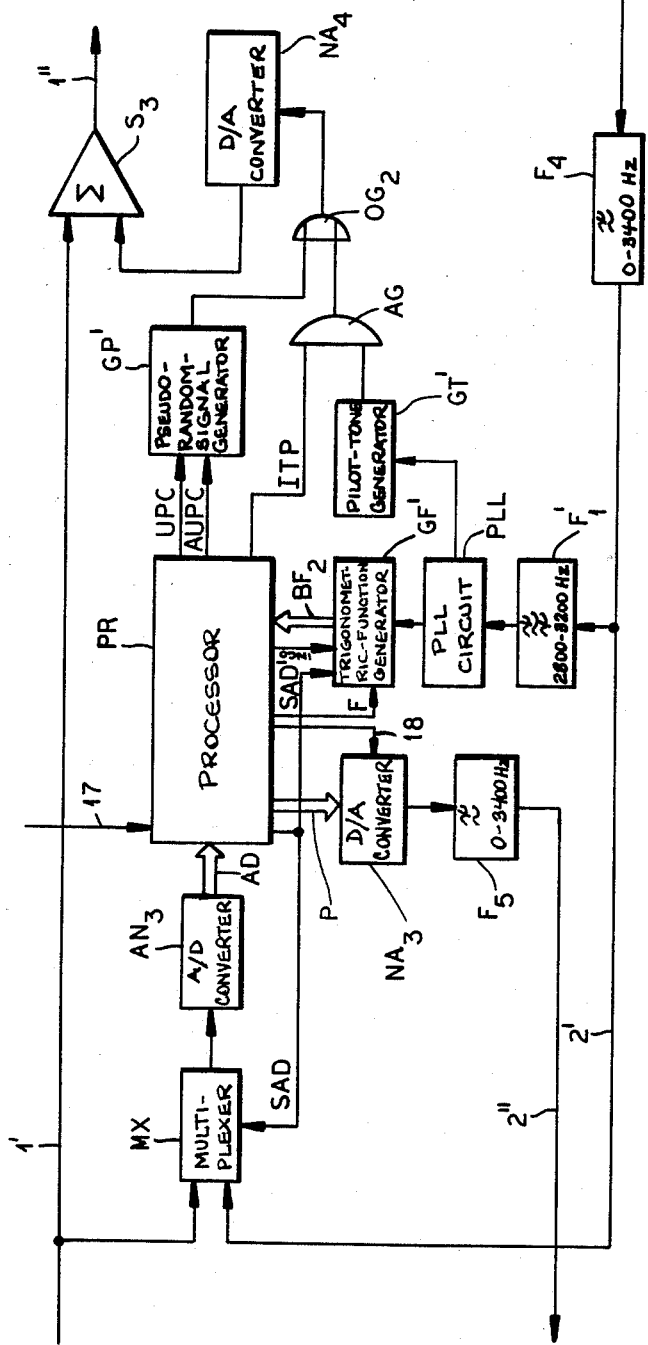
FIG. 4 is a block diagram of another echo-elimination device according to our present invention.

In FIG. 4 we have shown an alternative embodiment of our present invention in which a microprogram-controlled processor PR performs the tasks of control logic LC, echo calculator SE, correlator CR, delay circuit LR, Hilbert filter FH, registers $R_1$–$R_4$, multipliers $M_1$ and $M_2$, and adders $S_1$ and $S_2$. Conventional telephone-exchange equipment (not shown) for detecting the lifting of a handset by a called subscriber is linked to processor PR via a lead 17 for communicating thereto the establishment of a call connection.

Analog speech signals carried by a "receive in" branch section 1' and analog signals, both speech and echo, carried by a "transmit in" branch section 2' are alternately transmitted to an analog/digital converter $AN_3$ via a multiplexer MX whose switching functions are controlled by a signal SAD generated by processor PR. Converter $AN_3$ emits onto a bus AD, working into processor PR, digital speech-signal samples y(t) and digital echo-signal samples z(t) in response to the analog signals on lines 1' and 2'. The processor PR computes echo estimates v(t) for the speech signals carried by line 1', calculates phase-roll-compensated signals z'(t) from the speech and echo signals carried by line 2' and combines the echo estimates v(t) with the compensated signals z'(t) to form final digital output signals purged of echo effects. Processor PR emits the purged signals onto a bus P extending to a digital/analog converter $NA_3$ which is connected via a low-pass filter $F_5$ (0–3400 Hz) to a "transmit out" branch section 2". D/A converter $NA_3$ is enabled by processor PR via a lead 18.

A low-pass filter $F_4$ (0–3400 Hz) is inserted in line 2' ahead of a connection extending from this line to a trigonometric-function generator GF' (similar to generator GF of FIG. 1) via an analog low-pass filter $F_1'$ and a conventional analog phase-locking circuit PLL. Function generator GF' receives signals SAD' and INCO from processor PR and delivers digital samples of sine and cosine functions thereto via a bus $BF_2$.

Line 1' is connected to an input of an analog adder $S_3$ having an output tied to a "receive out" branch section 1" and another input linked to a digital/analog converter $NA_4$. This converter receives the digital output signals of a pseudorandom-signal generator GP' via an OR gate $OG_2$. Generator GP' is generally similar in structure to generator GP of FIG. 1; it is initialized by a signal AUPC and enabled by another signal UPC, both signals being emitted by processor PR. D/A converter $NA_4$ also receives pulse trains from a pilot-tone generator GT' via an AND gate AG and an OR gate $OG_2$. Processor PR enables by means of a signal ITP the transmission of the pulse-train output of generator GT' through gate AG. Pilot-tone generator GT' is identical in structure with component GT of FIG. 1.

Figure 5:
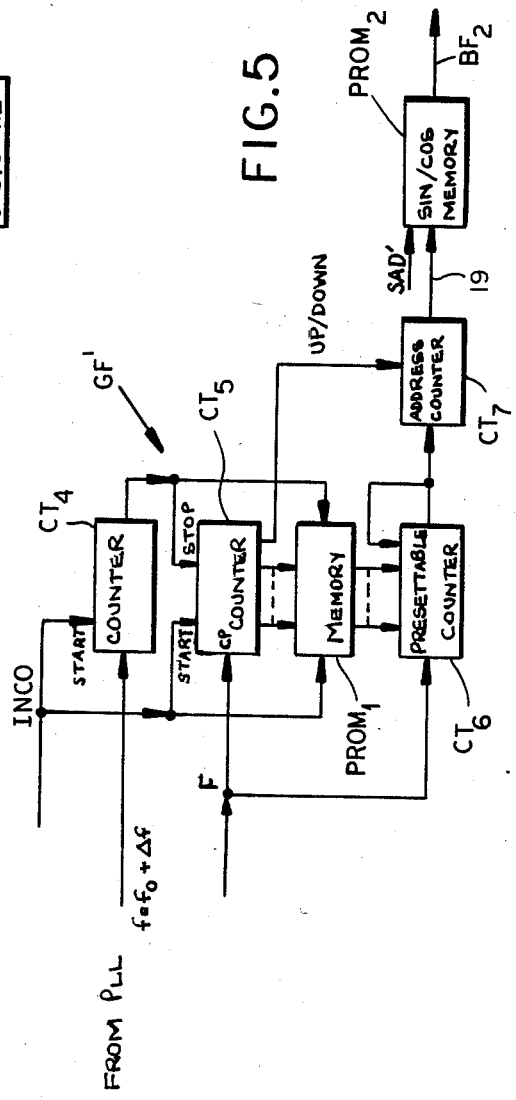
FIG. 5 is a diagram showing details of a trigonometric-function generator illustrated in block form in FIG. 4.

As illustrated in FIG. 5, trigonometric-function generator GF' comprises four binary counters $CT_4$–$CT_7$ and two programmable read-only memories $PROM_1$ and $PROM_2$. Counters $CT_5$ and $CT_6$ are stepped continuously during operation of the echo canceler of FIG. 4 by a square wave of reference frequency F generated by a time base BT in processor PR (see FIG. 6) while counter $CT_4$ is stepped during a calibration phase by a pulse train of frequency $f=f_0+\Delta f$ transmitted from phase-locking circuit PLL; $f_0$ is the frequency of a pilot tone emitted by generator GT' and $\Delta f$ is a frequency offset of phase roll introduced into the pilot tone by noncoherent demodulation of analog signal carriers. The phase-locking circuit may include a component for converting a sinusoidal waveform of "locked" frequency into a rectangular or square wave of the same frequency.

Counters $CT_4$ and $CT_5$ have count-start inputs connected to processor PR for receiving signal INCO at the beginning of the calibration or frequency-offset-calculation phase. Upon counting 2048 pulses in train f, counter $CT_4$ emits a signal to a count-stop input of counter $CT_5$. Frequency F is an integral multiple of frequency $f_0$, so that the number of stepping pulses received by counter $CT_5$ in the interval between the generation of the count-start signal INCO by processor PR and the emission of the stop pulse by counter $CT_4$ is a measure of the magnitude of frequency offset $\Delta f$.

All the stages of counter $CT_5$ with the exception of the last are connected via respective leads to an address input of memory $PROM_1$. Start signal INCO is fed to memory $PROM_1$ for enabling the reading therefrom of the contents addressed by the output of counter $CT_5$. Reading is inhibited and the signal levels on output leads of memory $PROM_1$ are frozen by the stop signal emitted by counter $CT_4$ at the end of the calibration phase. Memory $PROM_1$ converts the time measurement made by counters $CT_4$ and $CT_5$ into a frequency index which is loaded into counter $CT_6$. The frequency index serves as a modulus for counter $CT_6$, thereby determining the rate at which counter $CT_6$ feeds pulses to the stepping input of counter $CT_7$. This counter is of the up/down type with the direction of counting being controlled by the state of the final stage of counter $CT_5$. The stages of counter $CT_7$ are connected by a multiple 19 to an address input of memory $PROM_2$, processor PR also being connected to the address input of memory $PROM_2$ for delivering the signal SAD' thereto determining whether a digital sample emitted by that memory in response to the output of counter $CT_7$ is a sine or a cosine sample.

It is to be noted that the larger the frequency offset or deviation $\Delta f$, the smaller the modulus that memory $PROM_1$ feeds to counter $CT_6$. As the modulus of counter $CT_6$ decreases, the rate at which counter $CT_6$ transmits stepping pulses to counter $CT_7$ increases. The consequent change in the addresses fed to memory $PROM_2$ results in the emission thereby of trigonometric functions of different frequencies.

Figure 6:
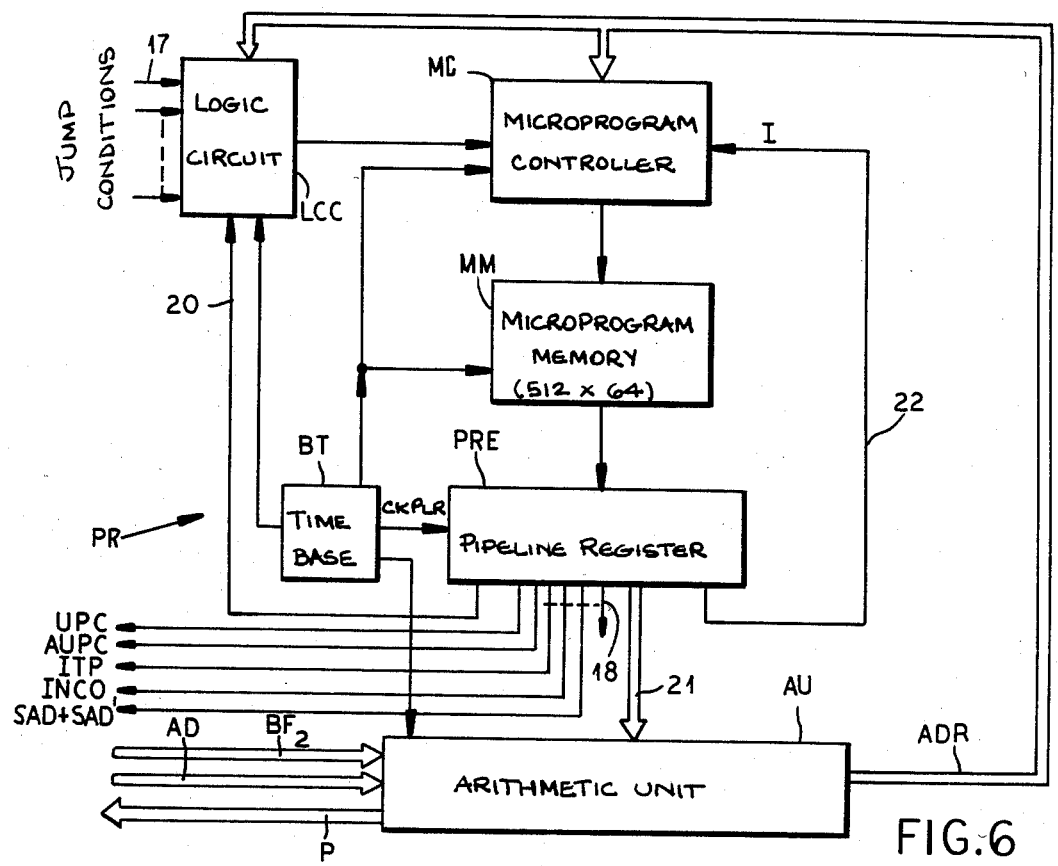
FIG. 6 is a diagram showing details of a processor illustrated in block form in FIG. 4.

As illustrated in FIG. 6, processor PR comprises a microprogram controller MC which emits to a microprogram memory MM in response to signals received from an arithmetic unit AU, via a bus ADR, from a "pipeline" register PRE and from a logic network LCC. Logic network LCC evaluates jump conditions coded by signals arriving on lead 17 from exchange equipment and on a multiple 20 extending from register PRE. In response to instructions from memory MM, register PRE emits initialization and enabling signals AUPC and UPC to pseudorandom-signal generator GP', an enabling signal ITP to gate AG, count-start signal INCO to counters $CT_4$ and $CT_5$, switching-control signal SAD to multiplexer MX, address signal SAD' to memory $PROM_2$ and a multiplicity of commands to arithmetic unit AU via a multiple 21. Buses AD, $BF_2$ and P are connected to arithmetic unit AU. The operations of this unit and of the other components of processor PR are timed by clock signals emitted by time base BT.

Figure 7:
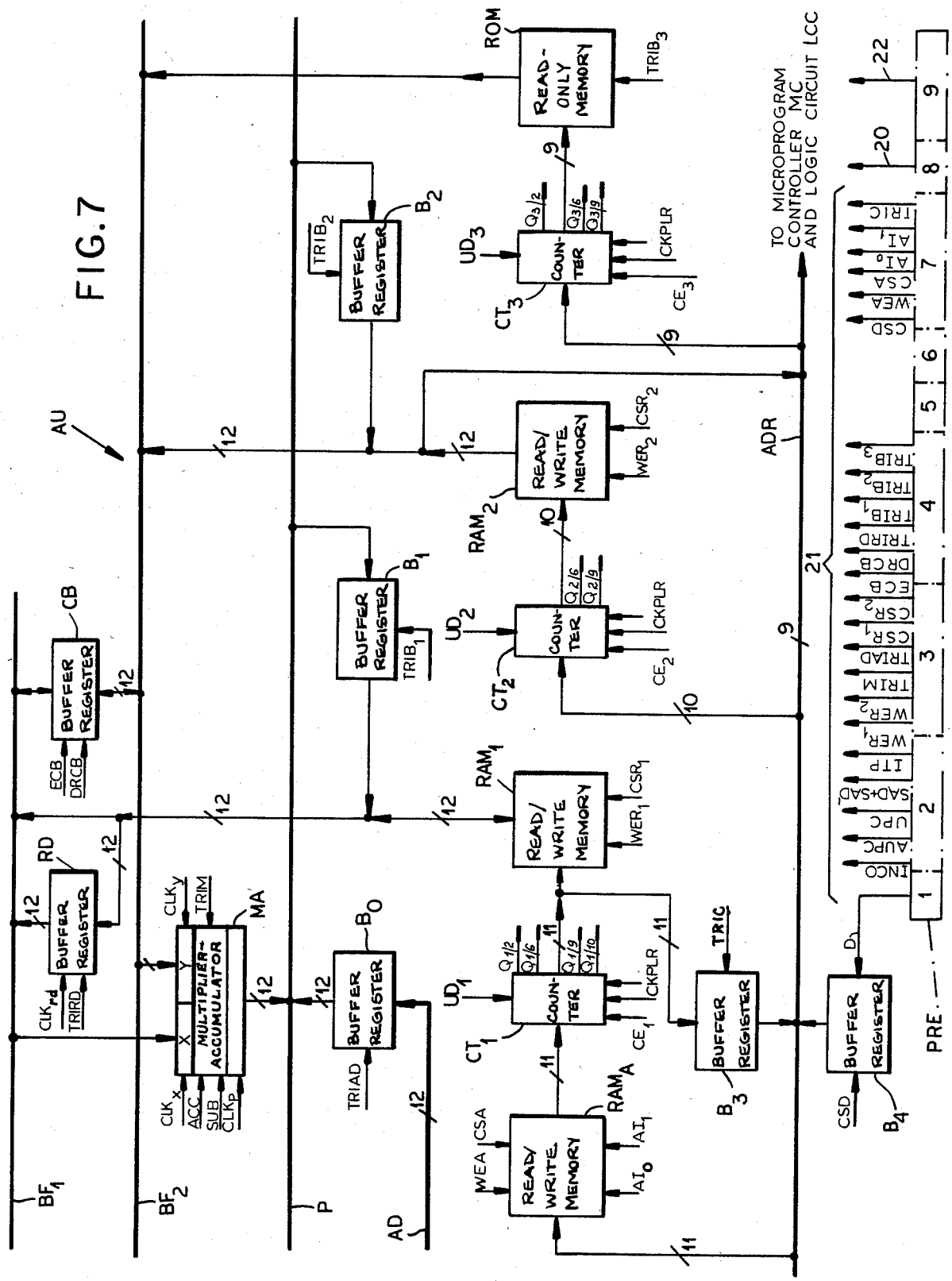
FIG. 7 is a diagram showing details of an arithmetic unit illustrated in block form in FIG. 6.

As illustrated in FIG. 7, arithmetic unit AU includes two read/write memories $RAM_1$, $RAM_2$ and a read-only memory ROM addressed by respective counters $CT_1$-$CT_3$. Memory $RAM_1$ receives a pair of signals $WER_1$ and $CSR_1$ from register PRE (FIG. 6) via multiple 21 for enabling writing and reading operations, respectively. A data-input/output terminal of memory $RAM_1$ is connected to bus AD via a tristate buffer register $B_0$, bus P and another tristate buffer register $B_1$ for receiving signal samples y(t) and z(t) from A/D converter $AN_3$, buffers $B_0$ and $B_1$ being controlled by signals TRIAD and $TRIB_1$ carried from register PRE by multiple 21.

In response to an address signal from counter $CT_1$ and write-enable signal $WER_1$, memory $RAM_1$ emits digitized speech and echo signals to a multiplier/accumulator MA via a bus $BF_1$ and also to a buffer register RD. Unit MA and register RD load these signals under the control of respective enabling pulses $CLK_x$ and $CLK_{rd}$ generated by register PRE on multiple 21 in response to instructions from microprogram memory MM. Buffer register RD implements the signal-retarding functions of delay circuit LR of FIG. 1, as described more fully hereinafter with reference to FIG. 11.

Read/write memory $RAM_2$ is tied to an output of multiplier/accumulator MA via bus P and a tristate buffer register $B_2$ activated by a command $TRIB_2$ transmitted over multiple 21. In response to an address from counter $CT_2$ and a writing command $WER_2$ from register PRE, memory $RAM_2$ loads convolution coefficients $h_n$ computed by multiplier/accumulator MA under the control of microprogram memory MM. Memory $RAM_2$ selectively transmits stored convolution coefficients to unit MA via bus $BF_2$ upon receiving a reading command $CSR_2$ from register PRE.

Memory ROM stores Hilbert coefficients $g_p$ for executing the Hilbert transform, pseudorandom-signal samples x(t) corresponding to the memorized contents of generator GP', and a threshold value for evaluating the quality of echo cancellation. Memory ROM selectively transmits its contents to unit MA via bus $BF_2$ in response to the address control of counter $CT_3$ and a reading command $TRIB_3$ from register PRE. Loading of data from bus $BF_2$ into unit MA is enabled by a command $CLK_y$ issuing from register PRE on multiple 21.

Buses $BF_1$ and $BF_2$ are interconnected by a bidirectional buffer register CB in which the direction and timing of information transfer are controlled by signals ECB and DRCB generated by register PRE on multiple 21 in response to microprogram instructions. Register CB is used, for example, to convey data from memory $RAM_2$ to multiplier/accumulator MA via bus $BF_1$ in the event that a calculation requires quantities stored in memories $RAM_2$ and ROM; data are fed from memory $RAM_2$ to a first input register X of multiplier/accumulator MA via bus $BF_2$, register CB and bus $BF_1$ and from memory ROM to a second input register Y of unit MA via bus $BF_2$.

Multiplier/accumulator MA receives, in addition to signals $CLK_x$ and $CLK_y$, a command TRIM to multiply quantities loaded into input registers X, Y of unit MA, a command ACC to add the resulting product to a sum stored in that unit, a command SUB to subtract one quantity from another, and a command $CLK_p$ to emit a computed result onto bus P.

A pulse train CKPLR generated by time base BT is fed to stepping inputs of counters $CT_1$-$CT_3$ and to register PRE (see FIG. 6) for timing the emission of control signals therefrom. Counters $CT_1$-$CT_3$ are stepped by train CKPLR only the transmission of respective enabling signals $CE_1$-$CE_3$ from register PRE via multiple 21. The directions of counting in components $CT_1$-$CT_3$ are determined by the logic levels of three further signals $UD_1$-$UD_3$ at the output of register PRE. Counters $CT_1$-$CT_3$ preferably have 11, 10 and 9 stages, i.e. flip-flops, respectively; the first, second, sixth, ninth and tenth stages of counter $CT_1$, the sixth and ninth stages of counter $CT_2$ and the second, sixth and ninth stages of counter $CT_3$ are connected to logic circuit LCC for informing microprogram controller MC of the attainment of predetermined settings by the counters. Counters $CT_2$ and $CT_3$ receive initial and jump addresses from register PRE via a bus D, a buffer register $B_4$ and bus ADR, while initial and jump addresses for counter $CT_1$ are stored in an additional read/write memory $RAM_A$ connected at a data input to bus ADR. The contents of memory $RAM_A$ are updatable according to the count by component $CT_1$, such count being transmittable to memory $RAM_A$ via a buffer register $B_3$ and address bus ADR. The storage and emission operations of buffers $B_3$ and $B_4$ are controlled by microprogram memory MM by means of a pair of signals TRIC and CSD carried from register PRE over multiple 21.

Memory $RAM_A$ receives writing and reading commands WEA and CSA and address-coding signals $AI_0$ and $AI_1$ from register PRE. This memory stores the address of the speech or echo samples which is to be replaced after each computation with the most recent sample, as described in detail hereinafter with reference to FIGS. 11 and 12.

As shown in FIG. 7, register PRE is divided into nine fields. The initial and jump addresses D for counters $CT_2$ and $CT_3$ are loaded into buffer register $B_4$ from the first field of that register. The second field emits signals INCO, AUPC, UPC, SAD, SAD' and ITP which control the operation of devices external to the processor PR, while the third and fourth fields transmit writing and reading commands $WER_1$, $WER_2$, $CSR_1$ and $CSR_2$ to memories RAM$_1$ and RAM$_2$, reading command TRIB$_3$ to memory ROM, control signals TRIAD, TRIB$_1$, TRIB$_2$, TRIRD, ECB and DRCB to buffer registers B$_0$–B$_2$, RD and CB, and multiplication command TRIM to unit MA. The other signals controlling the operation of multiplier/accumulator MA are transmitted thereto from the fifth field of register PRE. The sixth field generates counter-enabling signals CE$_1$–CE$_3$ and counting-direction signals UD$_1$–UD$_3$. The seventh field controls buffer register B$_4$ via signal CSD, register B$_3$ via signal TRIC and memory RAM$_A$ via signals WEA, CSA, AI$_0$ and AI$_1$. Multiple 20 extends to logic circuit LCC from the eighth field of register PRE, the ninth field transmitting feedback information to microprogram controller MC via a multiple 22.

Figure 8:
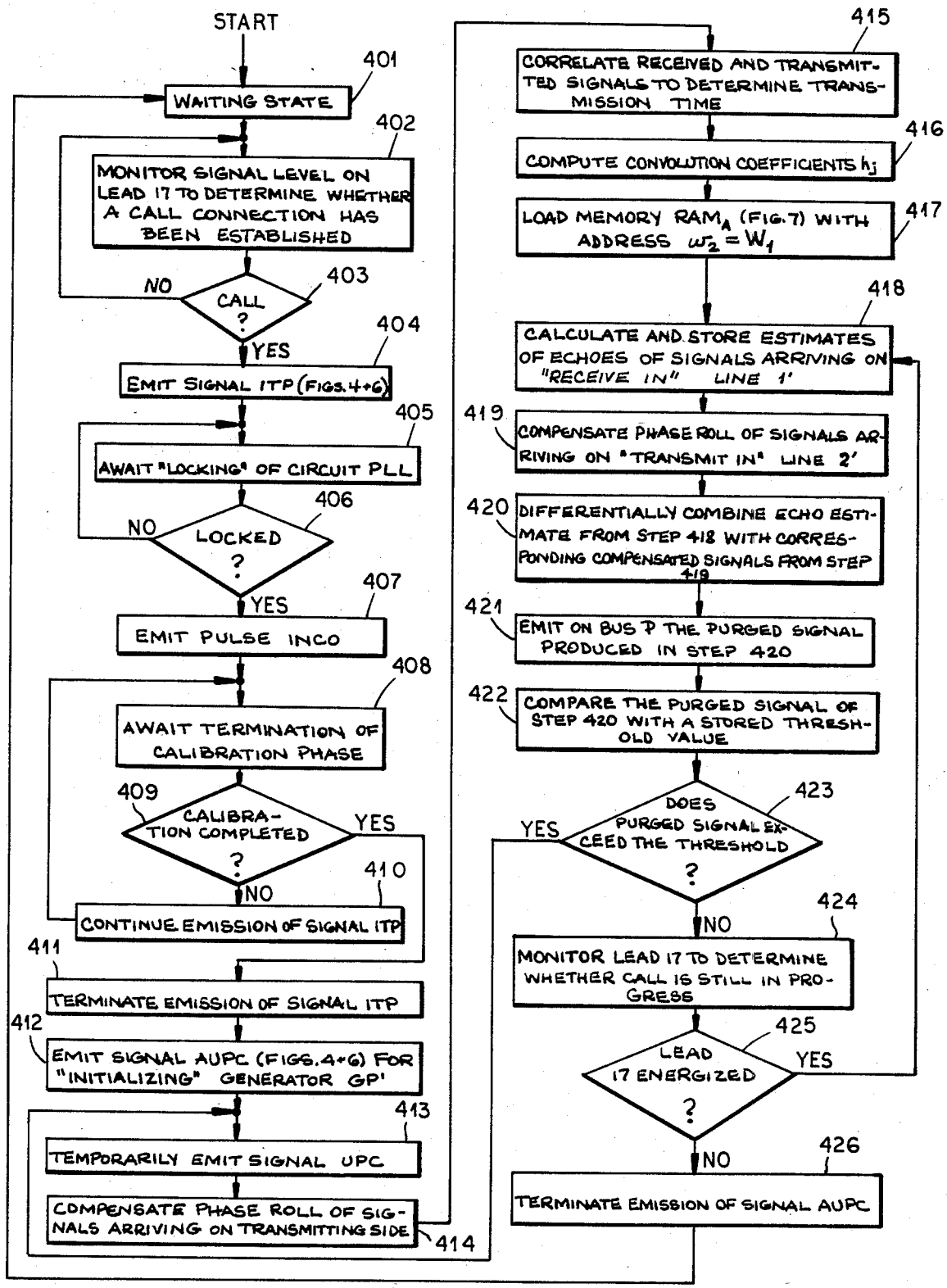
FIG. 8 is a flow chart indicating a sequence of operations executed by the processor of FIGS. 4 and 6.

We shall now describe the operation of the echo canceler and phase-roll compensator shown in FIG. 4 with reference to the flow-chart diagram of FIG. 8. Upon start-up, processor PR leaves a waiting state 401 to execute a scan 402 of lead 17 to determine whether a call connection has been established. If an inquiry 403 reveals that lead 17 is energized, processor PR emits signal ITP in a step 404 for enabling the transmission of a pilot tone from generator GT' over gates AG and OG$_2$ and D/A converter NA$_4$ to analog adder S$_3$. The processor then enters a state 405 wherein it awaits the "locking" of the phase-locking loop circuit PLL. Because the maximum propagation time, i.e. the interval between the emission of the pilot tone over line 1'' and the reception of the echo over line 2', is approximately 40 msec and the locking time of circuit PLL is approximately 200 msec, processor PR leaves waiting state 405 after 240 msec, as determined by the processor in a clock-signal check 406, and emits pulse INCO (step 407) to trigonometric-function generator GF' for enabling the stepping of counters CT$_4$ and CT$_5$ (FIG. 5) by frequencies $\underline{f}$ and F, respectively. The processor then enters yet another waiting state 408, this wait lasting approximately 750 msec or the time required for counter CT$_4$ to count 2048 cycles of frequency $\underline{f}$. During this 750-msec interval processor PR continues to emit signal ITP (step 410).

Upon discovering at a decision junction 409 that sufficient time has elapsed for the completion of frequency-offset calibration, i.e. for the emission of the stop signal by counter CT$_4$ and the consequent stabilization of the modulus of counter CT$_6$, processor PR terminates in a step 411 the emission of enabling signal ITP. Microprogram memory MM then causes register PRE to emit in a step 412 signal AUPC for resetting or initializing generator GP'. Immediately upon the emission of signal AUPC, register PRE temporarily generates signal UPC (step 413) to induce the transmission of a test-signal sequence from pseudorandom-signal generator GP' over gate OG and D/A converter NA$_4$ to analog adder S$_3$. During the transmission of the test signal from generator GP', signal UPC preferably is in the form of a square or rectangular wave having a period T equal in duration to the operating cycle of the processor. Each pulse or wave UPC causes the generation of a digital, particularly pulse-code-modulated (PCM), test-signal sample by unit GP'.

Echo signals and speech signals arriving over line 2' are sampled by processor PR at a rate 1/T, the sampling being implemented by the periodic switching of multiplexer MX under the control of signal SAD. The analog samples are converted into PCM signals by unit AN$_3$ (FIG. 4) and subsequently subjected to a phase-roll compensation at a step 414 or 419. The compensation operation implemented by processor PR, described in detail hereinafter with reference to FIG. 12, occurs once during each operating cycle of the processor.

Upon inducing the emission of a first test-signal sample by generator GP', processor PR begins sampling the voltage level of line 2' at a rate 1/T to determine in a step 415 the propagation time of electromagnetic waves in the established call connection, the propagation time being determined by means of a series of correlations and comparisons, as described hereinafter with reference to FIG. 9. The processor PR then computes at 416 the convolution coefficients or pulse response h$_j$ of the transmission channel. In a subsequent step 417 register PRE (FIGS. 6 and 7) loads into memory RAM$_A$ at a predetermined location w$_2$ an address W$_1$ of a cell in memory RAM$_1$. Memory RAM$_1$ is divided into two areas, the first having W$_1$ cells for storing speech samples y(t) and echo estimates v(t) calculated therefrom and the second having W$_2$-W$_1$ cells for storing echo- and speech-signal samples arriving over line 2'. Thus, memory RAM$_1$ can store a total of W$_2$ PCM samples.

Upon executing step 417, processor PR enters a sequence of steps 418–422 in which it calculates echo estimates corresponding to speech signals carried by line 1' (step 418), compensates the phase roll of signals arriving over line 2' (step 419), subtracts the echo estimates calculated in step 418 from the phase-roll-compensated signals produced in step 419 (step 420), emits the resulting difference onto bus P (step 421) and compares the echo-purged signal of step 421 with a threshold value stored in read-only memory ROM (step 422). If the echo-purged signal does not exceed the threshold, as ascertained by the processor at a decision junction 423, the processor monitors at 424 lead 17 (FIGS. 4 and 6) to determine whether the call is still in progress. If lead 17 is energized, indicating the continuance of the call, the processor decides at a junction 425 to re-enter sequence 418–422. If, however, lead 17 is de-energized, register PRE terminates at 426 the emission of signal AUPC in accordance with instructions from memory MM (FIG. 6) and the processor PR begins a wait 401 for another call connection. If the stored threshold value is exceeded by the echo-purged signal, the processor must recalculate the convolution coefficients h$_j$. Because such a recalculation requires the emission of another test signal by generator GP', processor PR reverts from junction 423 to step 413.

Figure 9:
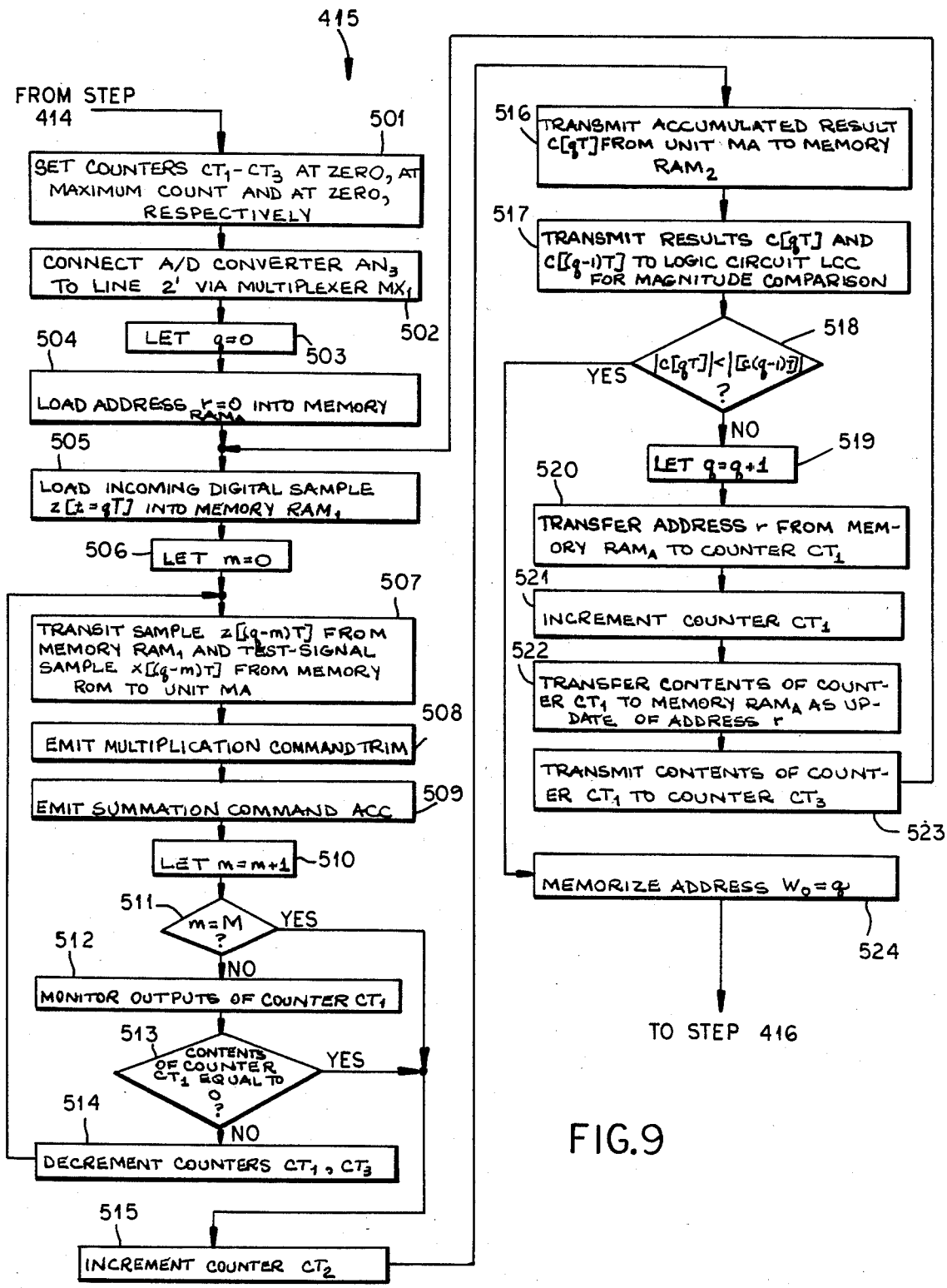
FIG. 9 is a more detailed flow chart illustrating a series of operations represented by a step 415 in FIG. 8.

As illustrated in FIG. 9, the calculation of transmission or propagation time in step 415 begins with an operation 501 in which microprogram memory MM sets the contents of counters CT$_1$ and CT$_3$ at zero and the contents of counter CT$_2$ at its maximum reading. The addresses for counters CT$_2$ and CT$_3$ are transmitted thereto from the first field of register PRE via buffer B$_4$ and address bus ADR, the loading and unloading of buffer B$_4$ being controlled by signal CSD emitted from the seventh field of register PRE. The setting of counter CT$_1$ may be implemented by reading from a predetermined address location in memory RAM$_A$.

Upon setting counters CT$_1$–CT$_3$, memory MM induces register PRE in an operation 502 to connect line 2' via multiplexer MX to A/D converter AN$_3$. Register PRE emits multiplexer-control signal SAD in the form of a square or rectangular wave having a frequency 1/T. Thus, lines 1' and 2' are each linked to converter AN$_3$ once per processor cycle. During correlation step 415 and coefficient-calculation step 416, processor PR handles only signals z(t) arriving over line 2', signal TRIAD disabling buffer register $B_0$ (FIG. 7) from loading the digitized speech-signal samples y(t) at the output of converter $AN_3$.

In an operation 503 immediately following operations 501 and 502, processor PR sets a loop parameter $\underline{q}$ equal to zero. Under the control of memory MM, register PRE then loads the first address of memory $RAM_1$, i.e. zero, into memory $RAM_A$ at a location $\underline{r}$ (operation 504). Because the contents of counter $CT_1$ were set at zero in operation 501, the zero address may be transmitted from counter $CT_1$ to the data input of memory $RAM_A$ via buffer $B_3$, register PRE enabling transmission by the timely generation of signals TRIC and WEA. Address $\underline{r}$ is communicated to memory $RAM_A$ via signals $AI_0$ and $AI_1$.

Upon the completion of operation 504, the first incoming digital sample z[t=0] is loaded into memory $RAM_1$ (operation 505) at the first cell thereof, as determined by the contents of counter $CT_1$. Register PRE implements the loading operation by emitting signals TRIAD and $TRIB_1$ enabling the transmission of the arriving sample through buffers $B_0$ and $B_1$; register PRE also emits writing command $WER_1$. In a subsequent operation 506 processor PR sets a second loop parameter $\underline{m}$ equal to zero. A sequence of operations 507-509 is then commenced in which the first incoming signal sample, z[0], is transmitted from memory $RAM_1$ to the input register X of multiplier/accumulator MA and a first test-signal sample x[0] is transmitted from memory ROM to the input register Y of unit MA (operation 507), multiplication command TRIM is emitted by register PRE for inducing unit MA to form the product of samples z[0] and x[0] (operation 508) and summation command ACC is generated for letting unit MA add the resulting product z[0]·x[0] to a previously calculated sum (operation 509). This sum is preset to be zero at the beginning of step 415. The presetting may occur upon start-up of the device by the automatic emission of reading command $CLK_p$.

Processor PR, by the operation of its logic circuit LCC and controller MC, increments parameter $\underline{m}$ in an operation 510 following sequence 507-509. upon determining in an inquiry 511 that the incremented parameter $\underline{m}$ has not yet reached a maximum M representing the number of multiplications or summations to be executed in each correlation calculation, logic circuit LCC and controller MC check at 512 and 513 the output of counter $CT_1$ to determine whether the count therein is zero. If counter $CT_1$ contains a memory address other than zero, controller MC induces register PRE via memory MM to emit signals $UD_1$, $UD_3$ and $CE_1$, $CE_3$ in an operation 514 for decrementing the contents of counters $CT_1$, $CT_3$; the processor then re-enters sequence 507-509. If, as after the loading of the first received digital sample z[0], counter $CT_1$ contains the first memory address, i.e. zero, or if parameter $\underline{m}$ has attained the maximum value M, register PRE emits up-/down signal $UD_2$ and counter-enabling signal $CE_2$ for incrementing the counter of component $CT_2$ in an operation 515. A sum c[qT] formed in unit MA in response to the last summation command ACC is then transferred from unit MA to memory $RAM_2$ (operation 516). Register PRE implements the transmission of sum c[qT] by generating signals $CLK_p$, $TRIB_2$ and $WER_2$.

Upon the loading of correlation sum c[(q−1)T] are transmitted to logic circuit LCC (operation 517) via address bus ADR for a magnitude comparison. If logic circuit LCC and the microprogram controller MC find at a decision function 518 that the correlation sum calculated in the current processor cycle is not less than the sum c[(1−1)T] derived during the prior cycle, processor PR undertakes a series of operations 519-523 in preparation for calculating another correlation sum. Processor PR increments parameter $\underline{q}$ at 519, transfers at 520 the address stored in location $\underline{r}$ in memory $RAM_A$ to counter $CT_1$, increments this counter at 521, transmits at 522 the contents of counter $CT_1$ to memory $RAM_A$ as an update of the address stored at location $\underline{r}$, and loads at 523 counter $CT_3$ with the address stored in counter $CT_1$. The processor PR then proceeds to repeat the operations of steps 505-510.

In the $q^{th}$ operating cycle during step 415 processor PR calculates the correlation c(qT):

$$c(qT) = \sum_{m=0}^{M'} z[(q-m)T] \cdot x[(q-m)T] \quad (6)$$

where upper summation limit M' is equal to parameter $\underline{q}$ or maximum M depending on whether parameter $\underline{q}$ is less than or greater than the value of maximum M. Correlation result c[qT] is compared with the previous result c[(q−1)T] at 517 and 518 to determine whether a peak or local maximum has been reached in the series of correlation results. If at decision junction 518 logic circuit LCC and controller MC have detected a correlation peak, the identity $\underline{q}$ of the current cycle is memorized at 524 as a measurement of the propagation time of electromagnetic signals along the transmission path of the monitored call connection. The number M of test-signal samples x[t] selected for calculating the correlation sums c[t] is advantageously of a sufficiently small value that the peak correlation value occurs in a cycle $W_0$ (see operation 524 in FIG. 9) after the $M^{th}$ cycle in step 415.

Figure 10:
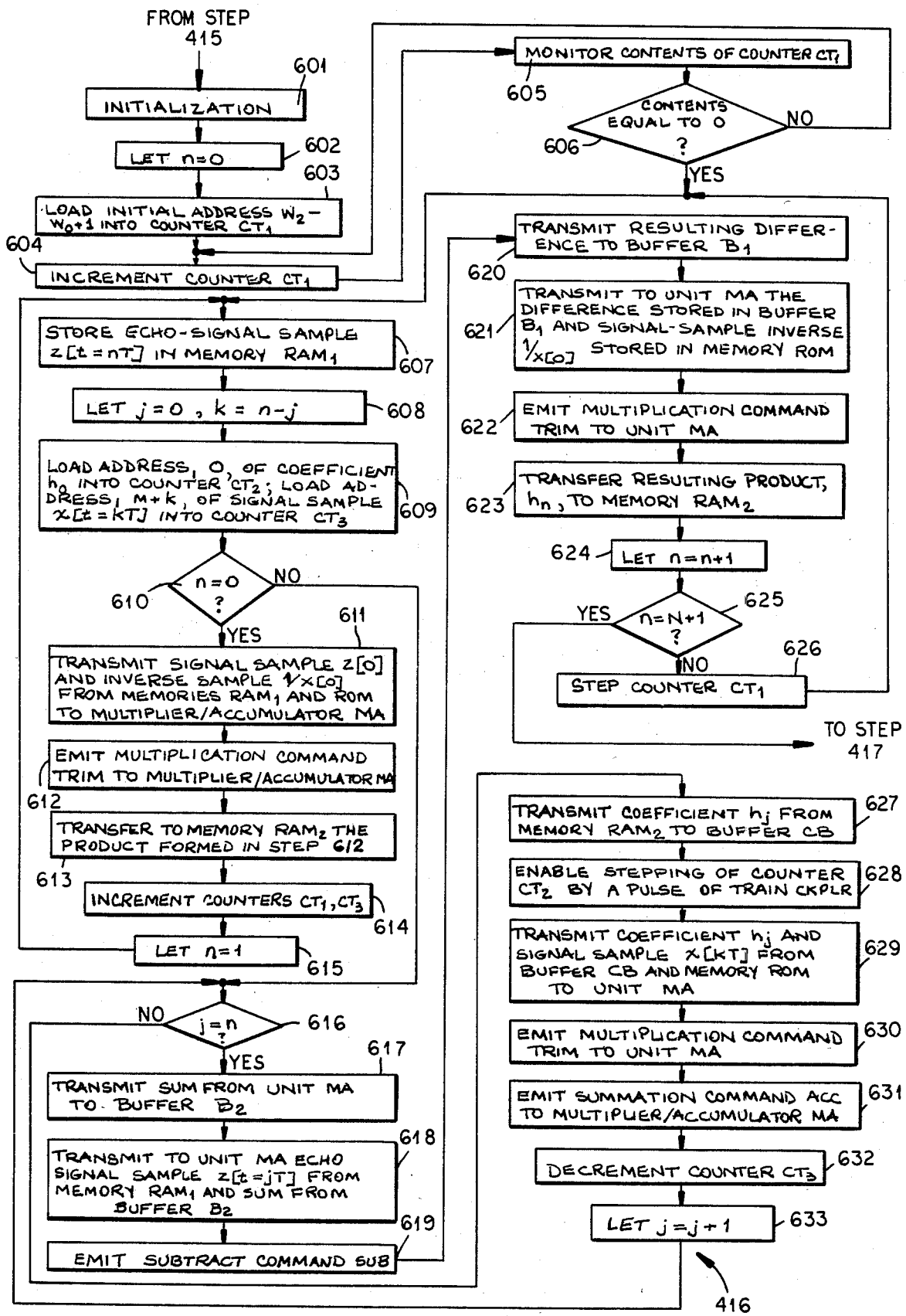
FIG. 10 is a more detailed flow chart illustrating a series of operations represented by a step 416 in FIG. 8.

As illustrated in FIG. 10, the computation of convolution coefficients $h_j$ (step 416) begins with an initialization operation 601 in which memories $RAM_1$ and $RAM_2$ are cleared. Upon the termination of the initialization operation, processor PR begins the emission of pulse sequence UPC (see FIGS. 4, 6 and 8) for enabling generator GP' to transmit a pseudorandom test signal x[t]. The number of pulses of sequence UPC emitted by processor PR equals the number of convolution coefficients to be calculated, a pulse of sequence UPC being emitted during each of the first N+1 cycles of step 416 after initialization 601.

Upon the emission of the first pulse of sequence UPC during step 416, processor PR enters a series of operations 602-606 in which it awaits the arrival on line 2' (FIG. 4) of the echo signal arising in response to the test signal generated by unit GP'. In operations 602 and 603 a parameter $\underline{n}$ is set equal to zero, which counter $CT_1$ is loaded vvia memory $RAM_A$ with an initial address $W_2-W_0+1$; integer $W_2$ represents the maximum address in memory $RAM_1$ and integer $W_0$ is the number of processor cycles corresponding to the propagation time of signals over the established call connection, integer $W_0$ being determined in step 415 as heretofore described. In operation 604 register PRE generates up-/down signal $UD_1$ and enabling signal $CE_1$ for incrementing the contents of counter $CT_1$. If, upon monitoring the contents of component $CT_1$ in operation 605 and inquiring at junction 606 as to the magnitude of those contents, logic circuit LCC and controller MC (see FIG. 4) find that the address stored in counter $CT_1$ is not equal to zero, register PRE is enabled to once again increment the contents of component $CT_1$ in operation 604. Operations 604–606 are repeated once per processor cycle for $W_0$ cycles.

Upon waiting $W_0$ cycles, processor PR executes a sample-storing operation 607, a parameter-setting operation 608 and a counter-loading operation 609. A first echo-signal sample z[0] is stored in memory $RAM_1$ at the first address thereof (operation 607), parameters $\underline{j}$ and $\underline{k}$ are set at zero (operation 608 and counters $CT_2$, $CT_3$ are loaded with addresses 0 and M, respectively (operation 609). Because parameter $\underline{n}$ is zero, as checked by processor PR in an inquiry 610, the processor enters a sequence of operations 611–613 in which the first convolution coefficient $h_0$ is computed and stored in memory $RAM_2$. In operation 611 register PRE generates reading commands $CSR_2$ and $TRIB_3$, thereby causing the emission of echo-signal sample z[0] and the inverse 1/x[0] of the first test-signal sample x[0] onto buses $BF_1$ and $BF_2$, respectively. Register PRE simultaneously generates signals $CLK_x$ and $CLK_y$ to enable the loading of samples z[0] and 1/x[0] into the input registers X and Y of multiplier/accumulator MA. In operation 612 multiplication command TRIM is transmitted from register PRE to unit MA for inducing the formation thereby of the product z[0]·1/x[0]. The generation of signals $CLK_p$, $TRIB_2$ and $WER_2$ by register PRE in operation 613 implements the transmission from unit MA of the product $h_0 = z[0]\cdot 1/x[0]$ and the storage thereof in the first memory location of memory $RAM_2$.

The computation of coefficient $h_0$ is an accordance with the discrete form of the convolution equation:

$$z[t] = \sum_{u=0}^{N} h_u \cdot x[t - uT] \qquad (7)$$

Because there are no samples of the test signal x[t] prior to time t=0, i.e. because x[0] is the first non-zero test-signal sample, the equation for the first echo sample reduces to:

$$z[0] = h_0 \cdot x[0] \qquad (8)$$

from which the first coefficient $h_0$ is computable as the product of the first echo sample and the inverse of the first test-signal sample.

Upon the memorization of coefficient $h_0$ by memory $RAM_2$, register PRE emits signals $UD_1$, $UD_3$ and $CE_1$, $CE_3$ to increment the addresses in counters $CT_1$, $CT_3$ (operation 614) while parameter $\underline{n}$ is set equal to unity (operation 615). Register PRE then emits signals TRIAD, $TRIB_1$ and $WER_1$, thereby implementing the storage of a second arriving echo sample z[T] in memory $RAM_1$ (operation 607). In the ensuing operation 608 parameters $\underline{j}$ and $\underline{k}$ are set equal to zero and unity, respectively. Addresses O and M are then reloaded into counters $CT_2$ and $CT_3$ in operation 609. Because parameter $\underline{n}$ is no longer zero, processor PR follows inquiry 610 with another inquiry 616 for determining whether there is an identity between the values of parameters $\underline{j}$ and $\underline{n}$. Since there is no such identity when j=0 and n=1, register PRE generates signals $CSR_2$ and DRCB for transferring coefficient $h_O$ from memory $RAM_2$ to buffer CB in a first data-transmission operation 627. The pipeline register PRE then enables the incrementing of counter $CT_2$ by a pulse of stepping train CKPLR (operation 628). In a second data-transmission operation 629, register PRE emits signals ECB, $TRIB_3$, $CLK_x$ and $CLK_y$ for implementing the transfer of coefficient $h_O$ and test-signal sample x[T] from buffer CB and memory ROM to the input registers x and y of multiplier/accumulator MA, respectively. The emission of multiplication command TRIM by register PRE in a subsequent operation 630 induces unit MA to form the product $h_0 \cdot x[T]$. In response to summation command ACC, unit MA then adds this product at 631 to a sum stored in an accumulating register within the unit. When parameter $\underline{j}$ has the value zero, the sum stored in the accumulating register is zero owing to the automatic emptying of the register at the end of the preceding coefficient calculation.

Upon the completion of summation operation 631, register PRE decrements counter $CT_3$ (operation 632) while parameter $\underline{j}$ is given a value of unity in an operation 633. Because parameters $\underline{j}$ and $\underline{n}$ have the same value, as ascertained by processor PR at inquiry 616, the processor enters a sequence of operations 617–623 which is final in the computation of convolution coefficient $h_1$. In operation 617 register PRE emits signals $CLK_p$ and $TRIB_2$ to cause the transmission from unit MA to buffer $B_2$ of the sum stored in the accumulating register of unit MA. Register PRE is then instructed by the microprogram memory MM to generate signals $CSR_1$, $TRIB_2$, $CLK_x$ and $CLK_y$, thereby implementing in operation 618 the transmission of echo sample z[T] from memory $RAM_1$ and the accumulated sum from buffer $B_2$ to the input registers x and y of multiplier/accumulator MA. In the subsequent operation 619 command SUB is emitted by register PRE for inducing unit MA to form the difference between the value of sample z[T] and the previously computed sum, this difference then being transmitted to buffer $B_1$ in operation 620. In a third data-transmission operation 621 in sequence 617–623, register PRE generates commands $TRIB_1$, $TRIB_3$, $CLK_x$ and $CLK_y$ for transferring to the input registers x and y of unit MA the difference stored in buffer $B_1$ and the signal-sample inversion 1/x[0] stored in the $M^{th}$ cell of memory ROM. The contents of registers x and y of unit MA are then multiplied in response to command TRIM from register PRE (operation 622), the resulting product $h_1$ being transferred in operation 623 to memory $RAM_2$.

The calculation of coefficient $h_1$ is in accordance with the discrete convolution equation (7). Because there are only two non-zero signal samples x[0] and x[T] prior to or concurrent with instant t=T, equation (7) reduces to:

$$z[T] = h_0 \cdot x[T] + h_1 \cdot x[0] \qquad (9)$$

The product $h_0 \cdot x[T]$ is first computed in the aforedescribed operations 627–631. The difference $z[T] - h_0 \cdot x[T]$ is then formed in operation 619, the product $(z[T] - h_0 \cdot x[T]) \cdot 1/x[0]$ finally being calculated in operation 622.

Upon the loading of coefficient $h_1$ into memory $RAM_2$, processor PR increments parameter $\underline{n}$ at 624 and checks at 625 whether the new value is equal to a maximum N+1. Because N is greater than unity, i.e. because there remain further convolution coefficients to be computed, counter $CT_1$ is incremented in an operation 626, a third echo-signal sample z[2T] being loaded into memory $RAM_1$ at the address stored in counter $CT_1$ (operation 607). Parameters $\underline{j}$ and $\underline{k}$ are then set at zero and two, respectively, in operation 608 and counters CT$_2$, CT$_3$ are loaded with addresses 0 and M+2 in operation 609.

In general, for each signal sample z[nT] the sum $$\sum_{u=0}^{n-1} h_u \cdot x[(n - u)T]$$

is computed by multiplier/accumulator MA under the control of register PRE in $\underline{n}$ successive traversals of operating sequence 627–633 by processor PR. Upon the $n^{th}$ traversal, parameter $\underline{j}$ is incremented in operation 633 to have the same value as parameter $\underline{n}$, so that processor PR enters into sequence 617–623. In operation 617 unit MA forms the difference $$z[nT] - \sum_{u=0}^{n-1} h_u \cdot x[(n - u)T].$$

This difference is then multiplied by signal-sample inversion 1/x[0] in operation 622 to calculate coefficient h$_n$. Upon discovering in inquiry 625 that all the convolution coefficients h$_0$–h$_N$ have been computed, processor PR proceeds to operation 417 (FIG. 8) in which a location w$_2$ in memory RAM$_A$ is loaded with the address W$_1$ incremented by one.

Figure 11:
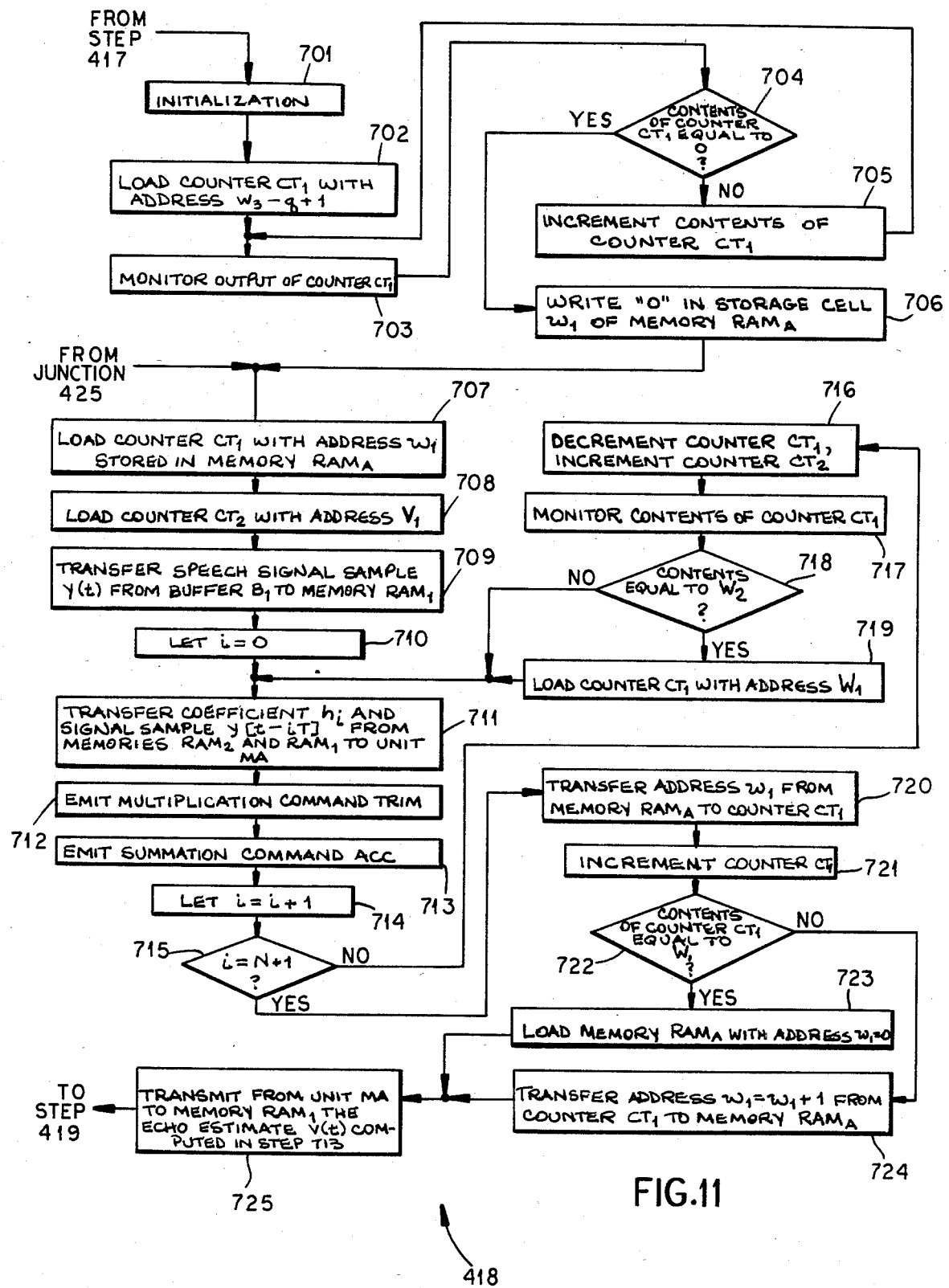
FIG. 11 is a more detailed flow chart illustrating a series of operations represented by a step 418 in FIG. 8.

As illustrated in FIG. 11, the calculation of echo estimates in accordance with the convolution coefficients computed in step 416 begins with an initialization operation 701 similar to operation 601 (FIG. 10); the contents of memory RAM$_1$ are erased whereas the coefficients h$_0$–h$_N$ stored in memory RAM$_2$ are preserved.

Upon the completion of initialization 701, register PRE under the control of microprogram memory MM loads counter CT$_1$ in an operation 702 with address W$_2$–W$_0$+1. The processor PR then enters a waiting state in which it monitors the contents of counter CT$_1$ at 703, inquires at 704 whether the contents of this counter are equal to zero and recurrently increments the counter contents at 705. If logic circuit LCC and microprogram controller MC find at inquiry 704 that the count level in component CT$_1$ is zero, register PRE emits signals TRIC and WEA for feeding the zero address from counter CT$_1$ via buffer B$_3$ to a location w$_1$ in memory RAM$_A$ determined by address signals AI$_0$ and AI$_1$ (operation 706).

In a subsequent operation 707 register PRE generates reading command CSA for enabling the loading into counter CT$_1$ of the address stored in memory RAM$_A$ at location w$_1$. Counter CT$_2$ is then set by an address V$_1$ at its minimum reading, i.e. zero, in an operation 708, and a first speech-signal sample y[t=0] previously transmittedfrom line 1' to converter AN$_3$ (FIG. 4) via multiplexer MX, transformed into a digital signal pattern by converter AN$_3$ and transmitted to buffer B$_1$ via bus AD, buffer B$_0$ and bus P, is transferred in a data-transmission operation 709 from buffer B$_1$ to memory RAM$_1$. Upon setting a parameter $\underline{i}$ equal to zero in an operation 710, microprogram controller MC induces register PRE via memory MM to emit signals CSR$_1$, CSR$_2$, CLK$_x$ and CLK$_y$, thereby transmitting speech-signal sample y[0] and convolution coefficient h$_0$ from memories RAM$_1$ and RAM$_2$ to the input registers x and y of multiplier/accumulator MA in an operation 711. In response to command TRIM generated by register PRE in an operation 712, unit MA multiplies the contents of its input registers to form product h$_0$·y[0]. This product is then introduced into the accumulating register of unit MA in a summation operation 713.

Upon the storing of product h$_0$·y[0] in the accumulatingregister of unit MA, processor PR sets parameter $\underline{i}$ at a value of unity in an operation 714 and then checks at 715 whether the new parameter value is equal to the number of convolution coefficients h$_0$–h$_N$. Because integer N will always be greater than zero, the outcome of inquiry 715 is the decrementing of counter CT$_1$ and the simultaneous incrementing of counter CT$_2$ (operation 716). Logic circuit LCC and controller MC then monitor the output leads of counter CT$_1$ in a scan 717 to determine in an inquiry 718 whether the contents of the counter are equal to the maximum count W$_2$. If the answer to this inquiry is affirmative, register PRE acts in a loading operation 719 to change the contents of component CT$_1$ to the pre-established value W$_1$ representing the storage capacity, diminished by one, of an area of memory RAM$_1$ assigned to the memorization of speech-signal samples y[t].

Upon the completion of loading operation 719, processor PR repeats operation 711-713 for coefficient h$_1$ and a corresponding signal sample y[–T]. In operation 711 register PRE emits signals CSR$_1$, CSR$_2$, CLK$_x$ and CLK$_y$ for transmitting to the input registers of unit MA from stores RAM$_1$ and RAM$_2$ the contents of memory RAM$_1$ at address W$_1$ and the convolution coefficient h$_1$. Owing to the clearing of memory RAM$_1$ during the initialization operation 701 and the lack of speech-signal input to memory RAM$_1$ prior to time t=0, the contents of this memory at addresses W$_1$, W$_1$–1, W$_1$–2 . . . W$_1$–N+1 are zero. Thus, product h$_1$·y[–T] as well as products h$_2$·y[–2T],h$_3$·y[–3T] . . . h$_N$·y[–NT] computed by unit MA in N–1 subsequent repetitions of operation 712 are equal to zero and the sum calculated by processor PR during the first cycle of step 418 in accordance with the discrete convolution equation (7) consists of the single term h$_0$·y[0]

In general, an echo estimate v[t] corresponding to speech-signal sample y[t] is computed by processor PR in N+1 traversals of sequence 711–715 and N repetitions of operations 716–718, whereby the following discrete convolution equation is implemented:

$$v(t) = \sum_{u=0}^{N'} h_u \cdot y[t - uT] \tag{10}$$

Upper summation limit N' is equal to the number of convolution coefficients h$_0$–h$_N$, diminished by one, provided that more than N speech-signal samples have been loaded into memory RAM$_1$ since the onset of echo-calculation phase 418 (see FIGS. 8 and 11). Otherwise, upper summation limit N' is equal to the number of loaded speech-signal samples less one.

If logic circuit LCC and microprogram controller MC discover at inquiry 715 that parameter i is equal to the number of convolution coefficients h$_0$–h$_N$, such equality signaling the completed computation of an echo estimate v[t], register PRE emits address signals AI$_0$ and AI$_1$ and reading command CSA for feeding to counter CT$_1$ the RAM$_1$ address stored in memory RAM$_A$ at location w$_1$ (operation 720). Register PRE then generates up/down signal UD$_1$ and counter-enabling signal CE$_1$ to enable the incrementing of component CT$_1$ by a pulse of stepping-pulse train CKPLR (operation 721). At 722 logic circuit LCC and controller MC monitor the output leads of counter CT$_1$ to determine whether the contents of the counter are equal to the maximum $W_1$ established for the speech-signal area of memory $RAM_1$. If, on the one hand, the contents of counter $CT_1$ are discovered at 722 to be address $W_1$, memory location $w_1$ is loaded in an operation 723 with zero-level data bits. If, on the other hand, counter $CT_1$ does not contain address $W_1$, register PRE emits signals TRIC and WEA in an operation 724 for transferring the address contained in counter $CT_1$ to location $w_1$ in memory $RAM_4$. Upon the updating of the address at location $w_1$ in memory $RAM_4$ (operations 723 and 724) register PRE commands unit MA, buffer $B_1$ and memory $RAM_1$ in an operation 725 to transmit from the output register of the multiplier/accumulator MA to component $RAM_1$ the echo estimate $v[t]$ computed during the preceding traversal of sequence 711–713.

The Hilbert filter FH of FIG. 1 is implemented in the echo canceler of FIG. 4 as a transversal filter whose coefficients are stored in memory ROM (FIG. 7). The coefficients may assume values disclosed in the paper "On the Behavior of Minimax FIR Digital Hilbert Transformers" by L. R. Rabiner and R. W. Schafer in *The Bell System Technical Journal*, Vol. 53, No. 2, February 1974.

Figure 12:
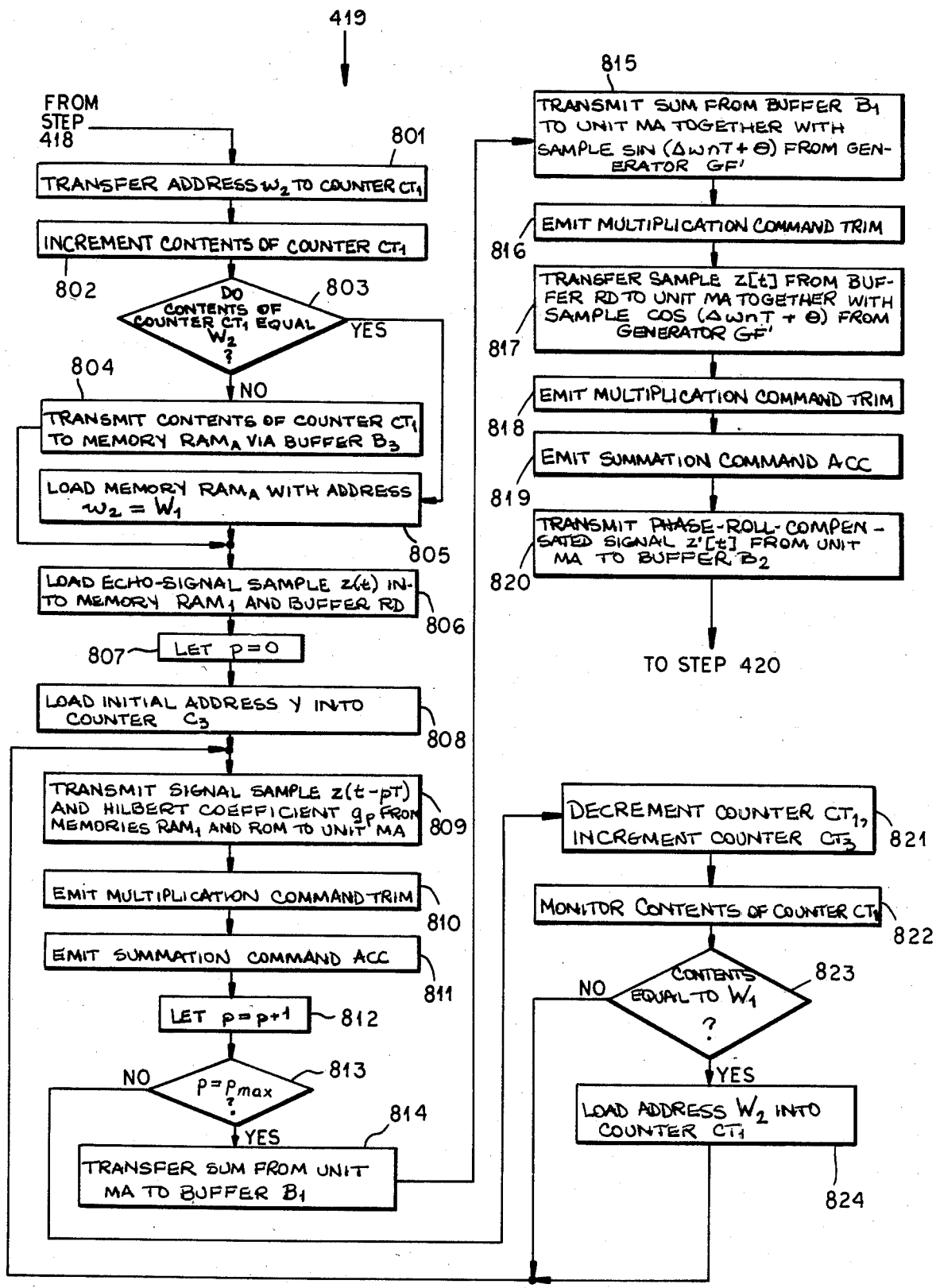
FIG. 12 is a more detailed flow chart illustrating a series of operations represented by a step 419 in FIG. 8.

As illustrated in FIG. 12, phase-roll compensation 419 (FIG. 8) begins with the transfer 801 of a $RAM_1$ address to counter $CT_1$ from a location $w_2$ in memory $RAM_4$, this address having been preset at value $W_1$ in step 417 (see FIG. 8). Register PRE then emits signals $UD_1$ and $CE_1$ in an operation 802 for incrementing the contents of counter $CT_1$. At a decision junction 803 logic circuit and controller MC inquire into the magnitude of these contents. If counter $CT_1$ contains address $W_2$, register PRE acts through buffer $B_4$ to load $RAM_1$ address $W_1$ into memory $RAM_4$ at location $w_2$ (operation 805); if the contents of component $CT_1$ are not address $W_2$, signals TRIC and WEA are generated in an operation 804 for transmitting the counter contents to memory $RAM_4$ via buffer $B_3$. Upon the updating of the address stored in memory $RAM_4$ at cell $w_2$ thereof, register PRE effectuates the transmission at 806 of a current echo-signal sample $z[t]$ from buffer $B_1$ to memory $RAM_1$ and buffer RD. In an operation 807 a parameter p is set equal to zero and in another operation 808 an initial address $y = M + N + 1$ is loaded into counter $CT_3$.

Processor PR then enters into a sequence of operations 809–811 in which an echo-signal sample $z[t-pT]$ and a Hilbert coefficient $g_p$ are transmitted to multiplier/accumulator MA from memories $RAM_1$ and ROM (operation 809), sample $z[-pT]$ and coefficient $g_p$ are multiplied to form a product $z[t-pT] \cdot g_p$ (operation 810) and this product is added to a sum stored in the accumulator register of unit MA. Upon the emission of summation command ACC by register PRE in operation 811, logic circuit LC and controller MC increment parameter p in an operation 812. If this parameter has not yet attained a maximum value $P_{max}$, as checked by controller MC in an inquiry 813, register PRE is instructed in an operation 821 to decrement the contents of counter $CT_1$ and to increment the ROM address stored in counter $CT_3$. Logic LCC and controller MC then monitor the output leads of counter $CT_1$ in an operation 822. If the counter's contents are found in an inquiry 823 to equal address $W_1$, address $W_2$ is loaded into the counter in an operation 824. Sequence 809–811 is then repeated for the new value of parameter p.

Upon the attainment of maximum value $P_{max}$ by parameter p, register PRE implements in an operation 814 the transfer to buffer $B_1$ from multiplier/accumulator MA of the sum stored in the accumulating register thereof. In a subsequent operation 815, register PRE emits signals $TRIB_1$, SAD' (see FIGS. 4 and 6), $CLK_x$ and $CLK_y$ for enabling the transmission to registers x and y of unit MA of the sum stored in buffer $B_1$ and trigonometric sample $\sin(\Delta\omega nT + \theta)$ from generator GF'. The contents of registers x and y are then multiplied in an operation 816, the resulting product being loaded into the accumulating register of unit MA. The echo-signal sample $z[t]$ received during the current processing cycle is transferred in an operation 817 from buffer RD to unit MA together with trigonometric sample $\cos(\Delta\omega nT + \theta)$ from generator GF'. In response to multiplication command TRIM emitted by register PRE at 818, unit MA forms a product $z[t] \cdot \cos(\Delta\omega nT + \theta)$ from the data stored in its input registers, this product being added at 819 to the product stored in the accumulating register of unit MA during multiplication operation 816. The resulting sum $z'[t]$ is a digital sample of a phase-roll-compensated signal and is transmitted in a final operation 820 of step 419 from multiplier/accumulator MA to buffer $B_2$.

Figure 13:
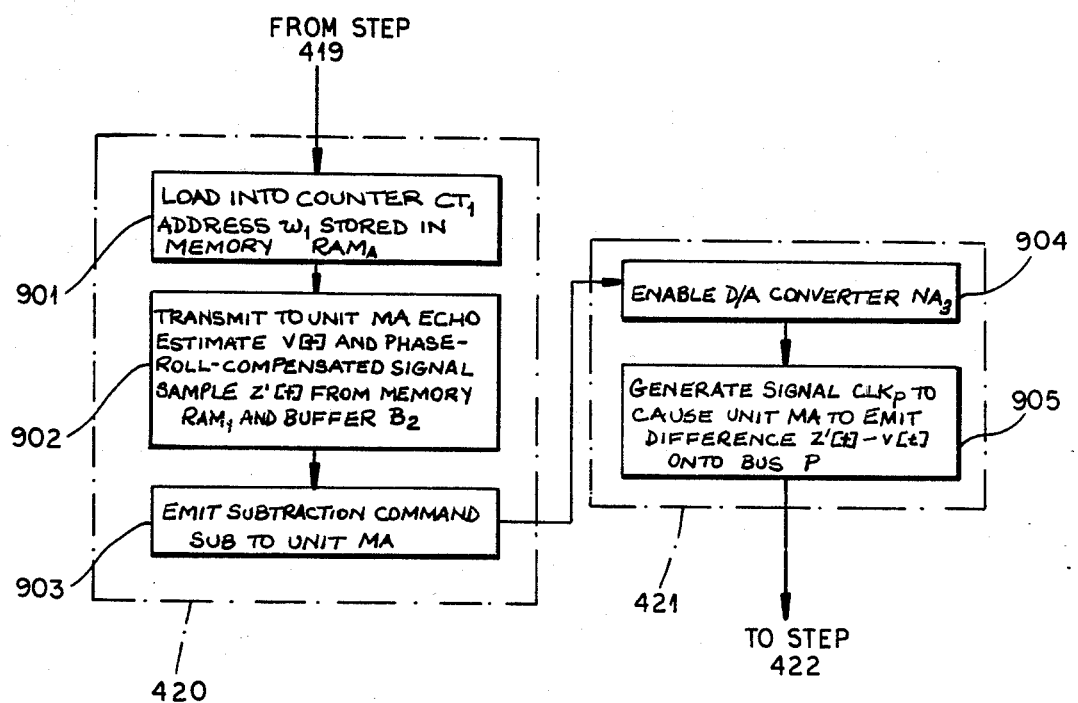
FIG. 13 is a more detailed flow chart illustrating a series of operations represented by steps 420 and 421 in FIG. 8.

As shown in FIG. 13, difference-forming step 420 (see FIG. 8) for producing an echo-purged signal comprises the operations of loading into counter $CT_1$ the $RAM_1$ address stored in memory $RAM_4$ at location $w_1$ (operation 901), transmitting to unit MA via buses $BF_1$ and $BF_2$ the echo estimate $v[t]$ and the phase-roll-compensated signal $z'[t]$ from memory $RAM_1$ and buffer $B_2$, respectively (operation 902), and emitting subtraction command SUB (operation 903). The resulting difference $z'[t] - v[t]$ is then emitted by unit MA onto bus P in response to signal $CLK_p$ from register PRE (operation 905), D/A converter $NA_3$ being temporarily enabled in an intervening operation 904.

We claim:
1. A circuit arrangement for eliminating transmitted echoes of received speech signals in a telephone trunk line extending between a remote trunk terminal and a hybrid coil coupling said trunk line to a local line, said trunk line having a first branch carrying received speech signals from said terminal to said hybrid coil and a second branch carrying transmitted speech signals from said hybrid coil to said terminal, said echoes being due to an imperfect match between said hybrid coil and said lines and being affected by a phase roll between said branches, comprising:

calibration means operatively linked to said branches for determining a frequency offset due to the phase roll between a received signal arriving over said first branch and a corresponding transmitted signal carried by said second branch;

a read-only memory in said calibration means for generating digital samples of sine and cosine functions of said frequency offset in response to a signal representing a value of frequency offset;

analog/digital conversion means linked to said branches for generating digital samples of analog voice-frequency signals carried by said branches;

a pseudorandom-sequence emitter operatively connected at an output to said first branch;

signal-processing means connected to said conversion means and to said memory for utilizing digital signal samples therefrom to compensate phase roll of voice-frequency signals arriving on said second branch for computing convolution coefficients from test signals generated by said emitter and from returning echoes of said test signals, to compensate phase roll on signals present on said second branch due to voice-frequency signals arriving on said first branch, and for differentially combining calculated echo estimates with corresponding phase-roll-compensated signals to produce digital samples of voice-frequency signals purged of echo effects; and digital/analog conversion means connected to an output of said signal-processing means for transforming echo-purged signals from digital form to analog form.

2. A circuit arrangement as defined in claim 1 wherein said calibration means includes a pilot-tone generator operatively connected to said first branch, frequency-stabilizing means connected to said second branch for converting pilot-tone echoes to a binary pulse train, a source of a high-frequency binary reference signal, and comparison means for comparing the frequency of said pulse train with the frequency of said reference signal to produce said signal representing a value of said frequency offset, said comparison means being connected to said memory for addressing the contents thereof with said signal representing a value of said frequency offset.

3. A circuit arrangement as defined in claim 2 wherein said comparison means includes a first and a second counter which are stepped by said pulse train and said reference signal, respectively, said first counter having an output connected to a count-stop input of said second counter whereby the latter counts a number of cycles of said reference signal in a time interval defined by the occurrence of a predetermined number of cycles of said pulse train.

4. A circuit arrangement as defined in claim 3 wherein said comparison means further includes a third counter stepped by said reference signal and indexing means inserted between said second counter and said third counter for converting into a modulus for said third counter a time measurement represented by the contents of said second counter, a fourth counter being stepped by an output signal of said third counter and connected to an address input of said read-only memory.

5. A circuit arrangement as defined in claim 2 wherein said frequency-stabilizing means includes a phase-locking-loop circuit.

6. A circuit arrangement as defined in claim 1 wherein said signal-processing means further includes a multiplier/accumulator having a first input register and a second input register, a read/write memory connected via a first data bus to said first input register and via a second data bus and buffer-register means to said analog/digital conversion means for storing digital samples of voice-frequency signals carried by said branches, and an additional read-only memory connected via a third data bus to said second input register for storing samples of test signals generated by said emitter and coefficients for calculating a Hilbert transform utilized in compensating phase roll of signals arriving over said first branch.

* * * * *